TWO-DIMENSIONAL ASSOCIATIVE MEMORY SYSTEM

Filed June 18, 1965 10 Sheets-Sheet 1

INVENTORS
B. A. CRANE
J. A. GITHENS
BY M J Rackman
ATTORNEY

TWO-DIMENSIONAL ASSOCIATIVE MEMORY SYSTEM

April 2, 1968 B. A. CRANE ET AL 3,376,555

TWO-DIMENSIONAL ASSOCIATIVE MEMORY SYSTEM

Filed June 18, 1965 10 Sheets-Sheet 3

TWO-DIMENSIONAL ASSOCIATIVE MEMORY SYSTEM

TWO-DIMENSIONAL ASSOCIATIVE MEMORY SYSTEM

April 2, 1968 B. A. CRANE ET AL 3,376,555

TWO-DIMENSIONAL ASSOCIATIVE MEMORY SYSTEM

Filed June 18, 1965 10 Sheets-Sheet 9

United States Patent Office 3,376,555
Patented Apr. 2, 1968

3,376,555
TWO-DIMENSIONAL ASSOCIATIVE MEMORY SYSTEM

Bently A. Crane, Parsippany, and John A. Githens, Morris Township, Morris County, N.J., assignors to Bell Telephone Laboratories, Incorporated, New York, N.Y., a corporation of New York Continuation-in-part of application Ser. No. 395,161, Sept. 9, 1964. This application June 18, 1965, Ser. No. 465,088
27 Claims. (Cl. 340—172.5)

ABSTRACT OF THE DISCLOSURE

An associative memory system comprising a first and second array of storage cells, each cell in turn comprising a plurality of storage registers. Each cell in the first array shares a storage register with a particular cell in the second array to thereby enable transference of information between the two arrays. Operations may be performed on the cells in either array in accordance with the condition of cells in the other array.

This invention relates to information storage and retrieval systems, and more particularly to such systems in which retrieval is based on content rather than location. The application is a continuation-in-part of application Ser. No. 395,161, filed Sept. 9, 1964.

Most memory units in present day use are of the direct access type. Each memory location is identified by a respective address, and data is written into or read out of a particular location by specifying the respective address. In an associative memory, however, each memory location is not provided with a respective address. Instead, each location includes information and retrieval data. Often the two types of data are indistinguishable and the length of each type is variable. To operate on any given cell or memory location retrieval information may be applied to all cells simultaneously. A particular cell may be identified if its stored retrieval data matches the applied retrieval information. If necessary the information data stored in the cell may be read out once the cell is identified. Similarly, if information data is to be written into the cell, the data may be applied to all cells but the only cell in which the information data is written may be that in which a match of the applied retrieval information and the stored retrieval data takes place.

In our above-identified copending application an improved cell for an associative memory is described. A two-dimensional (X and Y) array of memory cells is also shown. The primary advantage of the two-dimensional array is that it affords very powerful bulk data processing properties. The individual cells are capable of performing logical operations, and in large arrays hundreds and even thousands of arithmetic operations may take place simultaneously. A particular example described in the above-identified copending application is matrix multiplication. In the two-dimensional associative memory of our invention two matrices may be multiplied in only a fraction of the time required to do the same thing on even the fastest and most sophisticated of present-day computers. The present invention is directed to the detailed organization of the two-dimensional associative memory array shown in our copending application, and also includes certain additional features which provide even more powerful bulk processing properties.

It is an object of this invention to improve the operation of an associative type memory and more particularly to improve the speed and flexibility of a two-dimensional associative memory.

The basic cell utilized in the illustrative embodiment of our invention is very similar to that shown in our copending application. Each cell includes data storage and control registers. Each cell is capable of communicating with the adjacent cells, and in accordance with data stored in the data registers of a cell the respective control registers govern logical operations in the same cell or in an adjacent cell. The three fundamental operations performed by each cell are reading, writing and comparing. Data applied to each cell may be compared with data stored in the cell. In accordance with the results of the comparison additional data may be written into or read out of the same cell or an adjacent cell.

The two-dimensional array consists of two interconnected sequences of cells. Each sequence of cells is basically a self-contained one-dimensional array but the two arrays interact in two ways. Each group of cells in the X dimension is associated with one cell in the Y dimension. One of the data storage registers in each of the cells in a group of X cells is shared by the respective Y cell. Thus information may be transferred between the X and Y dimensions by writing data into these shared data registers. This type of interaction between the two dimensions is of a one dimensional nature, that is, operations may be performed in either dimension on the shared registers. The other type of interaction is of a two-dimensional nature. Operations may be performed on the cells in either dimension in accordance with the condition of cells in the other dimension. Operations may be performed on a group of cells in the X dimension in accordance with the condition of the respective Y cell, and operations may be performed on a Y cell in accordance with the conditions of the X cells in the associated group.

In addition to the features described in our copending application the present invention includes certain additional features which increase the flexibility of the system. These features include circuits operative in only one dimension and circuits affecting the two-dimensional interaction. These features can be best appreciated in the context of the detailed disclosure set forth below.

A complete understanding of this invention and the various features thereof may be gained from consideration of the following detailed description in conjunction with the drawing, in which.

A single Y cell with its respective group of X cells is shown in detail in FIGS. 6–11. Each X cell is shown in a respective column. There are 24 X cells in all, each of which includes two control flip-flops CA and CB and ten data flip-flops. Nine of these data flip-flops are designated X1 through X9. The tenth data flip-flop in each X cell is one of the 24 flip-flops Y1 through Y24. For example, the tenth data flip-flop in the first X cell is Y1 and the tenth data flip-flop in the 24th X cell is Y24.

Figure 8:
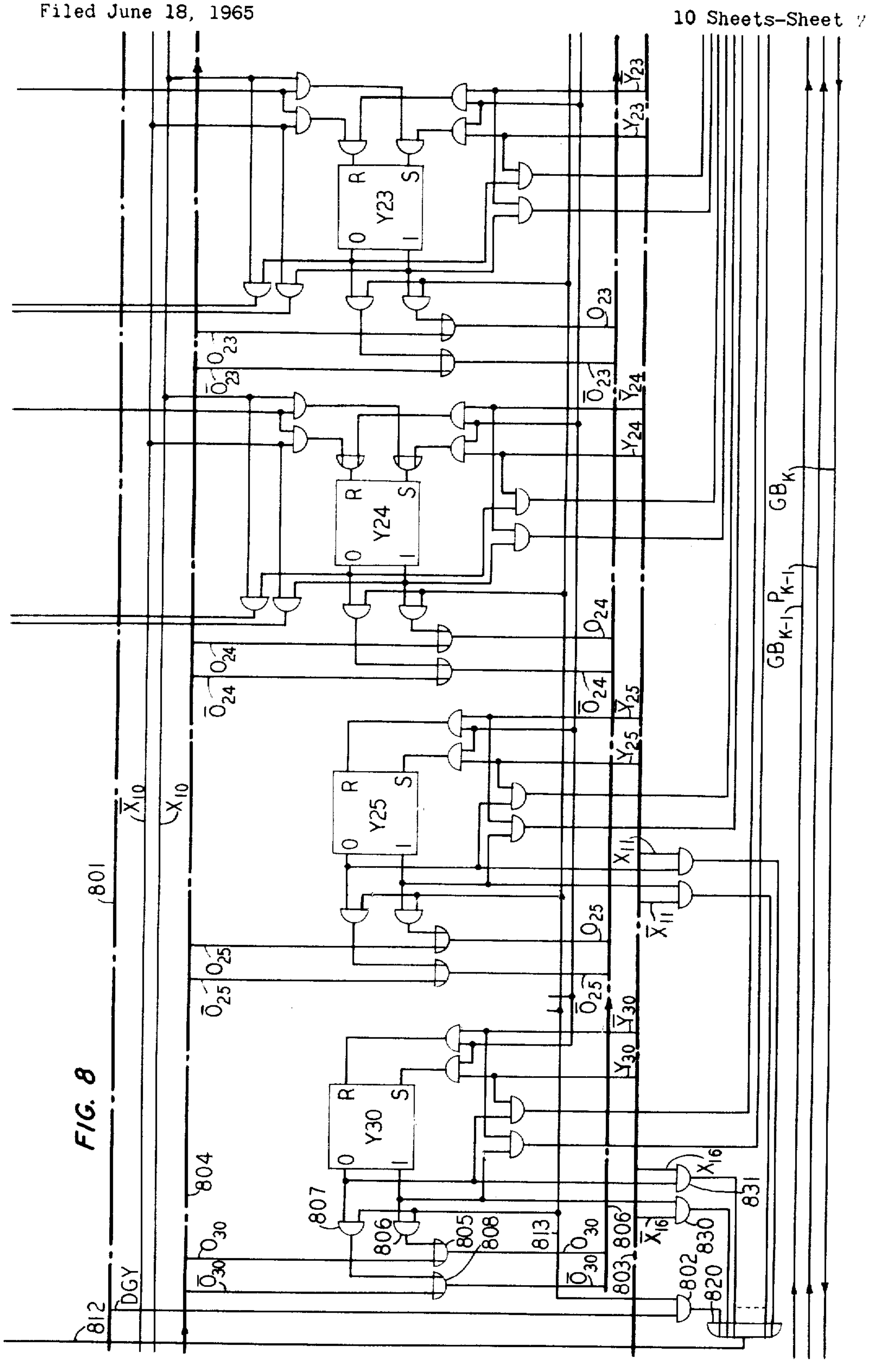
Figure 11:
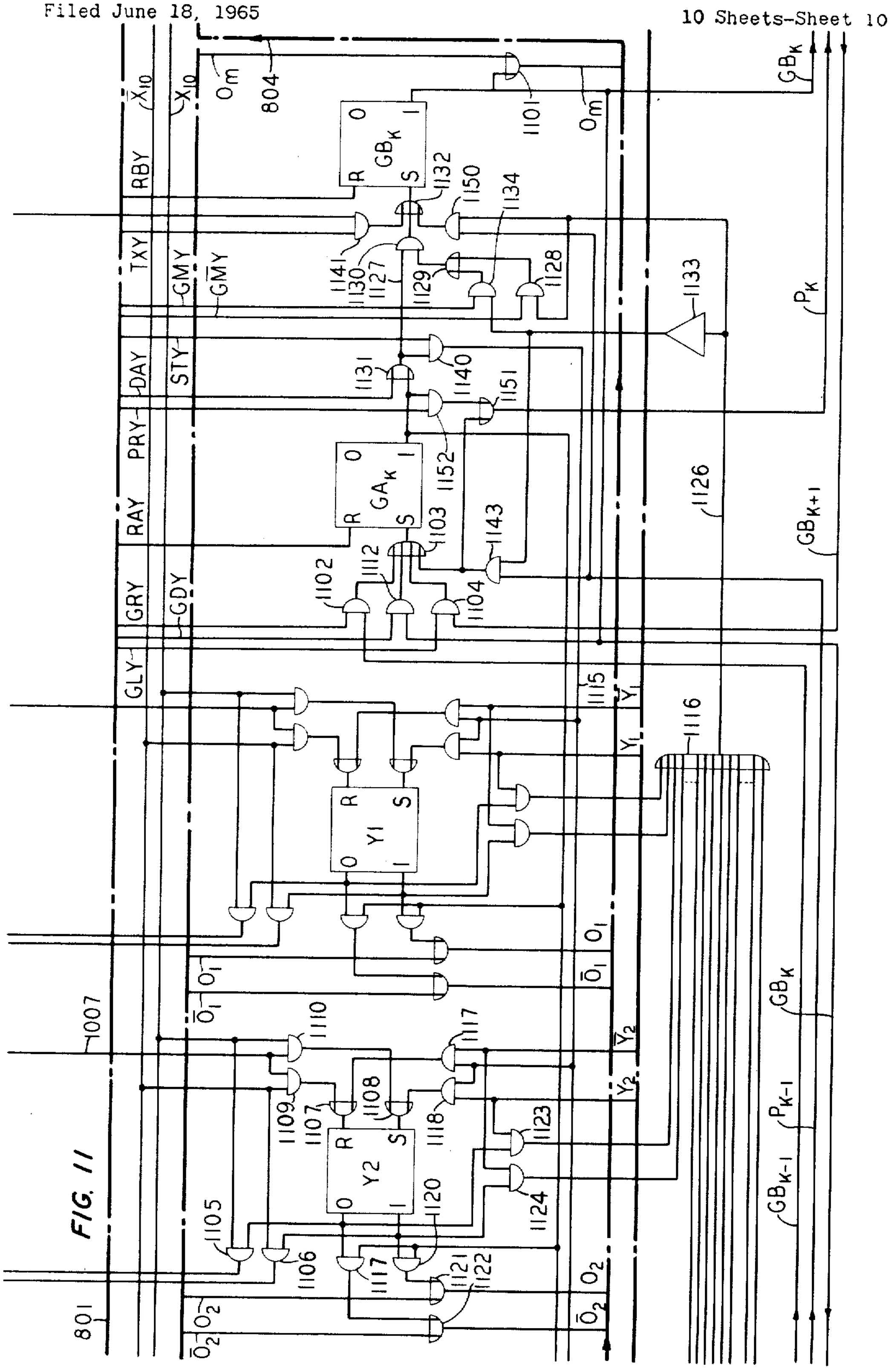

The Y cell appears in FIGS. 8 and 11. The cell includes two control flip-flops GA and GB. The subscript $k$ in each of the control flip-flop designations identifies the block of equipment shown in FIGS. 6–11 as being the $k$th in the overall array. The Y cell also includes 30 data flip-flops Y1 through Y30. Flip-flops Y1 through Y24 are shared with the X cells, and flip-flops Y25 through Y30 are unique to the Y cell. Before proceeding with a detailed description of the circuit operation, it will be helpful to identify the conductors extended to and from the circuits of FIGS. 6–11. These conductors may be considered in groups.

(1) *X control conductors.*—This group of conductors is extended along cable 601 from the control unit which governs the system operation to each group of X cells. The conductors in this cable are thus extended in parallel to each X cell group. Signals on these conductors control data operations in the X cells. The conductors in cable 601 are extended to the CA and CB flip-flops in the X cells. Except for the extention of conductors EAX and TGX to the first and last X cells in each group, the other X control conductors are connected in an identical manner to X cells 2 through 23 in all groups.

(2) *F control conductors.*—Cable 602 is also extended from the control to each group of X cells. This cable contains 24 conductors F1 through F24. In each group of X cells each of these conductors is coupled to a respective one of the X cells. Since the X control conductors are connected in an identical manner to each of the 24 X cells in a group (except for the first and last) it is desired that there be some way to directly identify a particular X cell in each group. For this reason the F conductors are provided. Signals on conductors F1 and F2, for example, identify X cells 1 and 2 in each group and in this manner operations may be performed in only these two cells in each group if necessary.

(3) *X data inputs.*—This group comprises 20 conductors extended from the control to the X cell data flip-flops. Conductors $X_1$ and $\overline{X}_1$ are extended to the X1 flip-flop in every X cell in the array. Thus in an M-cell array where each Y cell contains 24 cells, conductors $X_1$ and $\overline{X}_1$ are connected to 24M flip-flops. Similar remarks apply to the other 18 X data inputs. The 14 conductors extended to flip-flops X2 through X8 in each X cell are not shown since the respective flip-flops are also omitted from the drawing for the sake of clarity. Conductors $X_9$ and $\overline{X}_9$ are connected to flip-flop $X_9$ in each X cell for writing and comparison purposes. Finally, conductors $X_{10}$ and $\overline{X}_{10}$ are connected to flip-flops Y1 through Y24 in each Y cell. It is to be recalled that flip-flops Y1 through Y24 are treated as the tenth data flip-flops in respective X cells when operations are being performed in the X cells. Consequently a pair of X data input conductors is provided for these flip-flops.

Figure 9:
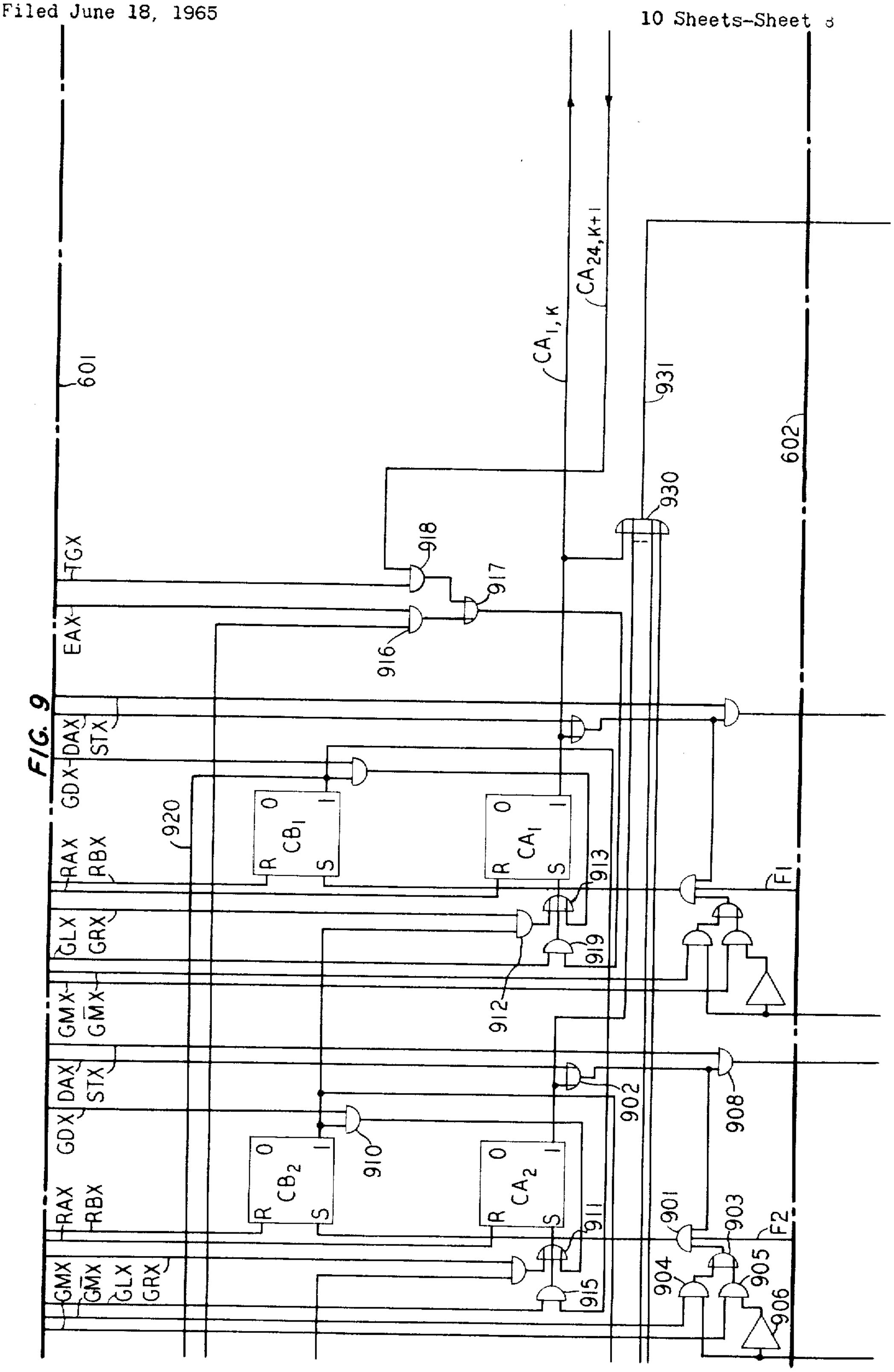
Figure 10:
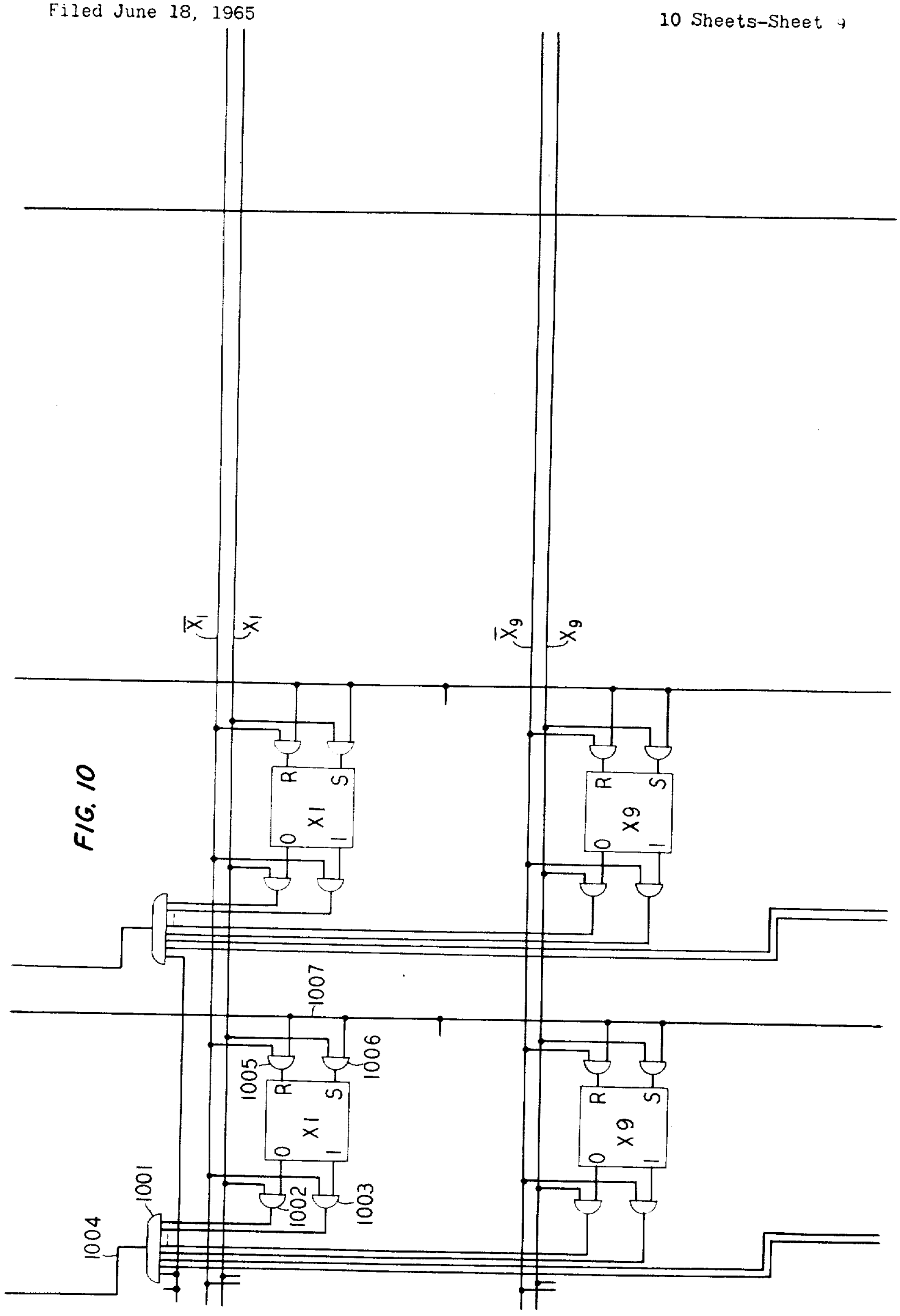

(4) *X-cell communication conductors.*—As will be described below, communication between adjacent X cells in any group of 24 is possible. However it is also desirable that there be some communication between the X cells in one group and the X cells in another. For this reason four conductors are extended from each group of X cells to enable communication between the first cell in the group and the 24th cell in the succeeding group, and the 24th cell in the group and the first cell in the preceding group. On FIG. 6 conductor $CA_{1,\ k-1}$ is extended from the 1 output of flip-flop $CA_1$ in the $k-1$ group of X cells. When this flip-flop is in the 1 state the conductor is energized and if the appropriate control signals are transmitted on X control conductor TGX and X control conductor GRX flip-flop $CA_{24}$ on FIG. 6 may be set in the 1 state. It should be noted at this point that when the CA flip-flop of an X cell is in the 1 state, the cell is considered to be active. The use of the active (and inactive) condition of cells will become apparent later. On FIG. 9 conductor $CA_{\ 1,\ k}$ is extended from flip-flop $CA_1$ to flip-flop $CA_{24}$ in X-cell group $k+1$. If the same X control conductors TGX and GRX are energized flip-flop $CA_{24}$ in group $k+1$ may be set in the 1 state if flip-flop $CA_1$ on FIG. 9 is in the 1 state. In a similar manner conductor $CA_{24,\ k+1}$ is extended from flip-flop $CA_{24}$ in group $k+1$ in the opposite direction to FIG. 9. If flip-flop $CA_{24}$ in group $k+1$ is in the 1 state and X control conductors TGX and GLX are energized, flip-flop $CA_1$ will be set in the 1 state. In a similar manner conductor $CA_{24,\ k}$ is extended from flip flop $CA_{24}$ on FIG. 6 to flip-flop $CA_1$ in group $k-1$ in order that the latter flip-flop be set in the 1 state if the former flip-flop is in the 1 state when X control conductors TGX and GLX are energized.

(5) *Y control conductors.*—Cable 801 on FIGS. 8 and 11 is extended from the control to all of the Y cells in the system. In this cable are included the conductors which when energized control the operations in the various Y cells. Except for conductor DGY which is connected to gate 802 all of the Y control conductors are connected either directly or through respective gates to control flip-flops $GA_k$ and $GB_k$ on FIG. 11. Similar connections are made in each of the Y cells and thus the same Y control signals are sent to all of the Y cells in the array.

(6) *Y data inputs.*—It will be recalled that the system includes 20 X data inputs which are connected in pairs to the ten respective data flip-flops in each X cell. In a similar manner 60 Y data inputs are provided, two for each of the same numbered data flip-flops in all of the Y cells. The 60 conductors are extended from the control along cable 803, for parallel connection to all of the Y cells. Thus conductors $Y_1$ and $\overline{Y}_1$ are coupled to flip-flop Y1 in each of the Y cells, and signals on this pair of conductors control the writing and comparing operations in the M Y1 flip-flops. Conductor pair $Y_2$ and $\overline{Y}_2$ are coupled to the Y2 flip-flop in each of the Y cells, etc. It is to be noted that each of the 30 data flip-flops in a Y cell may be written into in accordance with signals on the conductor pair $X_{10}$, $\overline{X}_{10}$ and in accordance with signals on a respective one of the Y, $\overline{Y}$ pairs.

(7) *Y output conductors.*—Data in the illustrative embodiment of the invention may not be read out of the flip-flops X1 through X9 in the X cells. Data may be read out of only the Y data flip-flops Y1 through Y30 in each Y cell. The read-out is parallel in that any one of the thirty O conductors is high in potential if the respective flip-flop in any one of the cells selected for read-out is in the 1 state, and the corresponding $\overline{O}$ conductor is high in potential if any one of the same flip-flops is in the 0 state. It is not possible, however, to couple the 1 and 0 outputs of the flip-flops directly to the output conductors because any output terminal which might be low in potential would short the high potential outputs. For this reason isolating gates are provided. The 60 output conductors $O_1$, $\overline{O}_1$ through $O_{30}$, $\overline{O}_{30}$ in cable 804 are extended to the $k$th Y cell from the immediately preceding cell. Consider output conductor $O_{30}$. If the Y30 flip-flop in any one of Y cells 1 through $k-1$ is in the 1 state conductor $O_{30}$ is energized. A signal is transmitted through OR gate 805 to conductor $O_{30}$ in cable 806. Cable 806 is extended to FIG. 11 where it is once again designated 804. Thus conductor $O_{30}$ is extended to the succeeding stage where it is similarly connected. If one of the preceding Y30 flip-flops is not in the 1 state and flip-flop Y30 on FIG. 8 is in the 1 state, and if the second input of gate 206 is energized, a signal is transmitted through this gate and OR gate 805 to conductor $O_{30}$. Once the conductor is energized the signal is transmitted through all of the succeeding stages to the final output circuit. At the end of the array the energization of conductor $O_{30}$ is an indication that at least in one of the selected Y cells (cell $k$ is selected if the second input to gate 806 is energized) flip-flop Y30 is in the 1 state. Conductor $\overline{O}_{30}$ is provided with a similar connection through cell $k$ except that gate 807 controls the energization of the conductor if flip-flop Y30 is in the 0 state with its 0 output high in potential. All of the remaining 29 flip-flops in each of the Y cells is similarly provided with a pair of output conductors. Functionally speaking the output terminals of the same numbered flip-flops are connected in parallel but for purposes of isolation the OR gates such as 805 and 808 are required.

In addition to the 30 pairs of output conductors the system also includes output conductor $O_m$. This conductor enters the $k$th stage and at the right end of FIG. 11 is extended to OR gate 1101. If the $O_m$ conductor is energized in one of the preceding cells a signal is transmitted through OR gate 1101 to the next cell. On the other hand, if conductor $O_m$ entering the cell is not energized but the 1 output of flip-flop $GB_k$ is high in potential, OR gate 1101 again controls the energization of conductor $O_m$ leaving the $k$th stage. Thus at the end of the array the $O_m$ conductor is energized if in any one of the Y cells in the array the respective GB flip-flop is in the 1 state.

(8) *Conductor pairs* $X_{11}$, $\overline{X}_{11}$ *through* $X_{16}$, $\overline{X}_{16}$.—These conductors are of a hybrid nature. Each has an X in its designation because they control operations in the X cells in any group. But they are connected to respective flip-flops Y25 through Y30 in the Y cells because it is the data in these flip-flops which actually determine whether the specified X cell operations are performed. Conductor pair $X_{11}$, $\overline{X}_{11}$ is associated with flip-flop Y25. Similar remarks apply to the eight conductors associated with flip-flops Y26 through Y29 (not shown), and conductors $X_{16}$ and $\overline{X}_{16}$ which are associated with flip-flop Y30. The 12 conductors are extended from the control to each of the Y cells in parallel along cable 803, the same cable which contains the Y data input conductors. One of the most powerful properties of the two-dimensional associative memory array of our invention is that operations may be performed in the X cells in any group depending upon whether certain data is contained in the data flip-flops in the respective Y cell. In the illustrative embodiment of the invention flip-flops Y25 through Y30 are used for this purpose. It is not necessary to examine all six of the flip-flops to determine whether an X cell command should be executed in the respective group of X cells. The control determines which of the flip-flops Y25 through Y30 in each Y cell should be examined to determine whether or not the X cell operation should be executed in the respective group of X cells. In accordance with the selection the six pairs of conductors $X_{11}$, $\overline{X}_{11}$ through $X_{16}$, $\overline{X}_{16}$ are appropriately pulsed. The pulsing of these conductors not only determines which of the flip-flops Y25 through Y30 in each Y cell should be considered, but in addition the particular bit values which must appear in these selected flip-flops in order for the operation to be performed in the respective group of X cells.

(9) *Y-cell communication conductors*.—This group of conductors allows communication between adjacent Y cells in the array. Conductor $GB_k$ on FIG. 11 is extended to Y cell $k+1$ and is energized if flip-flop $GB_k$ is in the 1 state. In a similar manner conductor $GB_{k-1}$ is extended from Y cell $k-1$ to cell $k$. This conductor is high in potential if flip-flop GB in cell $k-1$ is in the 1 state and controls the same operation in cell $k$ which is controlled by the energization of conductor $GB_k$ in cell $k+1$. If conductor $GB_{k-1}$ is energized and Y control conductor GRY is pulsed both inputs to gate 1102 are energized and a signal is transmitted through OR gate 1103 to set flip-flop $GA_k$ in the 1 state. In a similar manner if flip-flop $GB_k$ is in the 1 state and conductor GRY is pulsed flip-flop GA in cell $k+1$ is set in the 1 state. Conductor $GB_k$ in addition to being extended to cell $k+1$ is also extended to cell $k-1$. The energization of this conductor controls in cell $k-1$ the same operation controlled in cell $k$ by the energization of conductor $GB_{k+1}$. This latter conductor is high in potential if flip-flop GB in cell $k+1$ is in the 1 state. In such a case, and if control conductor GLY is pulsed both inputs to gate 1104 are energized and a pulse is transmitted through OR gate 1103 to set flip-flop $GA_k$ in the 1 state. In a similar manner, if flip-flop $GB_k$ is in the 1 state and conductor GLY is pulsed the GA flip-flop in cell $k-1$ is set in the 1 state. There is yet a third conductor extended between adjacent Y cells. Conductor $P_{k-1}$ may be energized in cell $k-1$ and as will be described below determines the setting of flip-flops $GA_k$ and $GB_k$. In a similar manner conductor $P_k$ may be energized in cell $k$ to control the setting of flip-flops GA and GB in cell $k+1$.

Having distinguished between the nine types of signals transmitted to and from each group of X cells and the respective Y cell, attention must now be directed to the particular operations performed in the circuit of FIGS. 6–11. Since all of the X cells except for cells 1 and 24 in each group are essentially the same, the operations in the X dimension may be best understood by considering a single cell, cell 2. Flip-flop $CB_2$ may be reset if the control applies a resetting pulse to conductor RBX. There is no way however for flip-flop $CB_2$ to be set directly. The flip-flop is set only when the three inputs to gate 901 are energized. One of these inputs is connected to the output of OR gate 902. If the flip-flop $CA_2$ is in the 1 state one input to OR gate 902 is energized and the rightmost input of gate 901 is high in potential. On the other hand, if control conductor DAX is pulsed OR gate 902 operates independent of the state of flip-flop $CA_2$. Thus if it is desired to control the setting of flip-flop $CB_2$ independent of the state of flip-flop $CA_2$ conductor DAX is pulsed. If flip-flop $CB_2$ is to be set only if flip-flop $CA_2$ is in the 1 state conductor DAX is not pulsed.

The second input to gate 901 is conductor F2. If this conductor is pulsed by the control, gate 901 may operate to set flip-flop $CB_2$. On the other hand, if conductor F2 is not pulsed flip-flop $CB_2$ may not be set even if the other two inputs to gate 901 are energized. Thus it is apparent that flip-flop $CB_2$ may be prevented from being set if conductor F2 is not pulsed. It will be recalled that signals transmitted along conductors F1 through F24 enable individual X cells or subgroups of X cells within a group of 24 X cells to be isolated. Since the setting of flip-flop $CB_2$ can be used to control subsequent operations in cell 2 it is seen that the signals transmitted along the F conductors provide the necessary isolation.

The third input to gate 901 is the output of OR gate 903. The operation of this OR gate depends upon the matching of the contents of flip-flops X1 through X9 and Y2 with data signals applied to the ten pairs of conductors $X_1$, $\overline{X}_1$ through $X_{10}$, $\overline{X}_{10}$. Data applied to these ten pairs of conductors control two operations. The data may be used for writing bit values into the ten flip-flops in each X cell. On the other hand, the data on these ten pairs of conductors may be compared with the data contained in the ten flip-flops in the X cell to obtain a match or a mismatch indication. Consider flip-flop X1 in cell 2. Suppose the bit value applied to conductor pair $X_1$, $\overline{X}_1$ is a 1. In this case conductor $X_1$ is high in potential and conductor $\overline{X}_1$ is low in potential. Thus one input of gate 1002 is high in potential and one input of gate 1003 is low in potential. If flip-flop X1 is in the 1 state the 0 output is low in potential and the 1 output is high in potential. Thus the second input of gate 1002 is low in potential and the second input of gate 1003 is high in potential. Since one input of each of the two gates is low in potential neither gate operates. On the other hand, if flip-flop X1 is in the 0 state, the second input of gate 1002 is high in potential and the second input of gate 1003 is low in potential. In this case gate 1002 operates to energize OR gate 1001. The resulting pulse on conductor 104 is an indication that at least one flip-flop in the X cell contains a bit value which does not match the bit value represented by the signal on the respective pair of conductors $X_1$, $\overline{X}_1$ through $X_{10}$, $\overline{X}_{10}$. If the system "doesn't care" about the content of flip-flop X1 neither conductor $X_1$ nor conductor $\overline{X}_1$ is pulsed. In such a case neither of gates 1002 and 1003 operates and OR gate 1001 cannot operate as a result of the contents of flip-flop X1. The OR gate can of course operate if one of the other nine flip-flops in cell 2 contains a bit which does not match the bit value applied to the respective pair of conductors $X_2$, $\overline{X}_2$ (not shown) through $X_{10}$, $\overline{X}_{10}$.

It should be noted that a similar connection is provided for flip-flop Y2. The $X_{10}$ and $\overline{X}_{10}$ signals are transmitted to respective gates 1105 and 1106. The 1 and 0 outputs of flip-flop Y2 are also extended to respective ones of these gates and the outputs of the two gates are extended to OR gate 1001. As a particular example of the match operation assume that signals representing a 0 are applied to conductor pair $X_1$, $\overline{X}_1$ and signals representing a 1 are applied to conductor pair $X_{10}$, $\overline{X}_{10}$. The other eight pairs of conductors are not pulsed since the match operation is independent of the contents of flip-flops X2 through X9 in all of the X cells. If flip-flop X1 in cell 2 contains a 0 and flip-flop Y2 in cell 2 contains a 1 none of the inputs to OR gate 1001 are energized and conductor 1004 is low in potential to indicate a match. On the other hand if flip-flop X1 contains a 1 and/or flip-flop Y2 contains a 0 conductor 1004 is high in potential to indicate a mismatch.

Inverter 906 inverts the signal on conductor 1004. Thus if conductor 1004 is high in potential one input to gate 904 is high in potential and one input to gate 905 is low in potential. On the other hand, if conductor 1004 is low in potential one input to gate 904 is low in potential and one input to gate 905 is high in potential. During the match operation one of conductors GMX and $G\overline{M}X$ is pulsed. Conductor GMX is energized if the CB flip-flops in the X cells are to be set as a result of a match condition. If the contents of flip-flops X1 through X9 and Y2 in cell 2 match the data applied to selected pairs of conductors $X_1$, $\overline{X}_1$ through $X_{10}$, $\overline{X}_{10}$ conductor 1004 is low in potential and one input to gate 905 is high in potential. With the energization of conductor GMX the second input of gate 905 is energized, the gate operates and a pulse is transmitted through OR gate 903 to the last input of gate 901. In such a case, provided the other two inputs to gate 901 are energized, flip-flop $CB_2$ is set. On the other hand, if the CB flip-flops in the X cells are to set only if the applied data does not match the data contained in the respective X cell flip-flops conductor $G\overline{M}X$ is energized. In this case only gate 904 can operate. This gate operates if conductor 1004 is high in potential, i.e., a mismatch of the applied data and the contents of cell 2 exists. When gate 904 operates a signal is transmitted through OR gate 903 to the third input of gate 901.

Thus there are a variety of factors which control the setting of flip-flop $CB_2$. If desired flip-flop $CB_2$ may be set only if flip-flop $CA_2$ is in the 1 state. On the other hand, if conductor DAX is pulsed the setting of flip-flop $CB_2$ is independent of the state of flip-flop $CA_2$. The setting of flip-flop $CB_2$ is also directly dependent upon the pulsing of conductor F2. Finallly, by pulsing one of conductors GMX and $G\overline{M}X$ the setting of flip-flop $CB_2$ may be controlled in accordance with a match or mismatch of the contents of cell 2 with the data signals applied to conductor pairs $X_1$, $\overline{X}_1$ through $X_{10}$, $\overline{X}_{10}$. As described above the data signals applied to the ten pairs of conductors $X_1$, $\overline{X}_1$ through $X_{10}$, $\overline{X}_{10}$ may be used for either comparison or writing purposes. Suppose it is desired to set the X1 flip-flops in the 1 state. Conductor $X_1$ is pulsed and conductor $\overline{X}_1$ is left low in potential. In this case one input to gate 1006 is high in potential and gate 1005 is inhibited from operating. If the other input to gate 1006, conductor 1007, is high in potential the gate operates and flip-flop X1 is set in the 1 state. One the other hand, to write a 0 in flip-flop X1 conductor $\overline{X}_1$ is pulsed rather than conductor $X_1$. In this case gate 1006 is inhibited from operating but gate 1005 operates if conductor 1007 is high in potential. Similar remarks apply to the other nine flip-flops in cell 2. It will be noted that the two inputs to flip-flop Y2 come from OR gates 1107 and 1108. These OR gates are required since flip-flop Y2 may be written into in accordance with X data signals or Y data signals. In the case of X data signals gate 1009 or 1010 operates to set flip-flop Y2 in the desired state. Again, one of these gates can operate only if conductor 1007 is high in potential.

Conductor 1007 is high in potential only if gate 908 operates. When it is desired to write X data in a cell, conductor STX is pulsed to energize one input of gate 908. During a match operation this conductor is not pulsed and the data signals on the ten pairs of conductors $X_1$, $\overline{X}_1$ through $X_{10}$, $\overline{X}_{10}$ do not control the writing of data in the X cell flip-flops. Conductor STX is energized only when data is to be written in the X cells. The second input to gate 908 can be energized in one of two ways. If data is to be written in only active cells, which, as noted earlier, are defined as cells in which the respective CA flip-flops are in the 1 state, conductor DAX is not pulsed. OR gate 902 operates to energize the second input to gate 908 only if flip-flop $CA_2$ is in the 1 state. On the other hand, if a cell is to be written into independent of its activity condition conductor DAX is pulsed to operate OR gate 902 whether or not flip-flop $CA_2$ is in the 1 state. OR gate 902 controls both the writing and comparison operations since the output of this gate is one of the inputs to both gates 908 and 901. Thus both writing and comparison operations may be made dependent upon the activity condition of cell 2 (represented by the state of flip-flop $CA_2$) or may be made independent of this condition if conductor DAX is pulsed.

Following a match operation some of the CB flip-flops in the X cells are in the 1 state. If a CB flip-flop is in the 1 state it is possible to set the CA flip-flop in the same cell in the 1 state. It is also possible to set the CA flip-flop in either adjacent cell in the 1 state. Suppose flip-flop $CB_2$ is in the 1 state and conductor GDX is pulsed. In this case both inputs to gate 910 are energized and this gate operates to transmit a pulse through OR gate 911 to set flip-flop $CA_2$. If conductor GDX is not pulsed and instead conductor GRX is energized, gate 912 operates to transmit a pulse through OR gate 913 to set flip-flop $CA_1$ in the 1 state. In this manner a CA flip-flop may be set in the 1 state if the CB flip-flop in the adjacent cell to the left is in the 1 state. In a similar manner if conductor GLX is pulsed a CA flip-flop may be set in the 1 state if the CB flip-flop in the cell to its right is in the 1 state. Suppose flip-flop $CB_1$ is cell 1 is in the 1 state and conductor GLX is pulsed. In this case both inputs to gate 915 are energized and a pulse is transmitted through OR gate 911 to set flip-flop $CA_2$ in the 1 state. Thus following a successful match or mismatch in a cell, the same cell or either adjacent cell may be activated.

The above description completely defines the operation of cells 2 through 23 in each group of X cells. Each of the end cells, 1 and 24, operates in a similar manner except that each of these cells is provided with two additional inputs, EAX and TGX, and additional circuitry. As described above the energization of conductor GLX or GRX enables a cell to be made active if the CB flip-flop in either adjacent cell is in the 1 state. Flip-flop $CA_1$ may be set in the 1 state if conductor GRX is pulsed and flip-flop $CB_2$ is in the 1 state. Very often however it may be desirable to set flip-flop $CA_1$ in the 1 state if flip-flop $CB_{24}$ in the same cell group is in the 1 state. This, in functional terms, is an "end-around shift." To accomplish this end-around shift conductors EAX and GLX are pulsed. If flip-flop $CB_{24}$ is in the 1 state a signal is transmitted along conductor 611 to one input of gate 916. When conductor EAX is energized gate 916 operates to transmit a pulse through OR gate 917 to one input of gate 919. With the energization of conductor GLX gate 919 operates to transmit a pulse through OR gate 913 to set flip-flop $CA_1$ in the 1 state. On the other hand, suppose it is desired to set flip-flop $CA_{24}$ in the 1 state if flip-flop $CB_1$ is in the 1 state, an end-around shift in the opposite direction. In this case conductor EAX is energized once again but this time conductor GRX is pulsed rather than conductor GLX. With flip-flop $CB_1$ in the 1 state conductor 920 is high in potential and one input of gate 612 is energized. When conductor EAX is pulsed, gate 612 operates to transmit a signal through OR gate 614 to one input of gate 616. With conductor GRX pulsed the other input to this gate is energized and gate 616 transmits a pulse through OR gate 609 to set flip-flop $CA_{24}$ in the 1 state.

It will be noted that thus far the operations performed in each group of X cells have been described to be independent of the operations performed in other groups of X cells. In executing some programs however it may be desirable to control the setting of flip-flop $CA_1$ in accordance with operations performed in the adjacent group of cells to the right and it may be desirable to set flip-flop $CA_{24}$ in the 1 state in accordance with operations performed in the adjacent group of X cells to the left. For this reason circuitry is provided to set flip-flop $CA_1$ in the 1 state if flip-flop $CA_{24}$ in the adjacent group of cells to the right is in the 1 state. Conductor $CA_{24,\,k+1}$ is connected to the 1 output of flip-flop $CA_{24}$ in the adjacent group of X cells to the right. If this conductor is high in potential and conductor GLX is pulsed together with conductor TGX (rather than conductor EAX), flip-flop $CA_1$ will be set in the 1 state. With the pulsing of conductor TGX gate 918 operates to transmit a pulse through OR gate 917 to one input of gate 919. With conductor GLX energized this gate operates to transmit a pulse through OR gate 913 to set flip-flop $CA_1$. Flip-flop $CA_{24}$ may be set in the 1 state if flip-flop $CA_1$ in the adjacent group of cells to the left is in the 1 state. In this case conductor TGX is energized together with conductor GRX, rather than conductor GLX. Conductor $CA_{1,\,k-1}$ is connected to the 1 output of flip-flop $CA_1$ in the adjacent group of cells to the left. If this flip-flop is in the 1 state the conductor is high in potential and when conductor TGX is pulsed gate 613 operates to transmit a pulse through OR gate 614 to one input of gate 616. When conductor GRX is pulsed the other input of gate 616 is energized and a pulse is transmitted through OR gate 609 to set flip-flop $CA_{24}$ in the 1 state. In a similar manner the state of flip-flop $CA_1$ on FIG. 9 may control the setting in the 1 state of flip-flop $CA_{24}$ in the adjacent group of cells to the right. Conductor $CA_{1,\,k}$ is connected to the 1 output of flip-flop $CA_1$ and is extended to the adjacent group of cells on the right. If conductor TGX is pulsed together with conductor GRX and flip-flop $CA_1$ is in the 1 state flip-flop $CA_{24}$ in X cell $k+1$ will be set in the 1 state. Similarly, the state of flip-flop $CA_{24}$ may control the setting of flip-flop $CA_1$ in the first X cell in group $k-1$. Conductor $CA_{24,\,k}$ is connected to the 1 output of flip-flop $CA_{24}$ and is extended to the adjacent X cell on the left. If flip-flop $CA_{24}$ is in the 1 state and conductor TGX is pulsed together with conductor GLX flip-flop $CA_1$ in X cell group $k-1$ will be set in the 1 state.

The operations described above which are performed in any group of X cells are essentially independent of the operations performed in the respective Y cell. There is one exception to this general statement. It will be noted that conductor 812 is connected to one input of OR gate 1001, and a similar connection is provided in each of the other 23 X cells in the same group. Conductor 812 is either energized or de-energized in accordance with certain data contained in the Y cell of FIGS. 8 and 11, as will be described below. The signal on conductor 812 is treated just as is the signal from a gate such as 1002 and 1003. If conductor 812 is low in potential it has no effect on the operation performed in the X cells. If the conductor is high in potential however conductor 1004 and the equivalent conductor in the other X cells are high in potential. Thus if conductor 812 is high in potential a "mismatch" condition is indicated in each of the X cells. The mismatch condition on conductor 1004 is used to control the setting of the CB flip-flops. Thus in accordance with the data contained in the Y cell, and the potential of conductor 812, operations may be controlled in all of the X cells in the respective group. The signal on conductor 812 and the equivalent conductors in the other Y cells may be used to identify particular groups of X cells. For example, suppose it is desired to set the CB flip-flop in each cell in any group of 24 X cells only if certain data is contained in the respective Y cell. Suppose further that this data results in a pulse on conductor 812. In this case no signals are applied to the ten pairs of conductors $X_1$, $\overline{X}_1$ through $X_{10}$, $\overline{X}_{10}$ and in only some groups of X cells the 24 conductors equivalent to conductor 1004 will be energized. If conductor $G\overline{M}X$ is also energized one input to each of the gates equivalent to gate 901 in each of the cells in these groups is energized. If the other two inputs to each of these gates are energized the respective CB flip-flops are set in the 1 state. Further isolation is possible by pulsing only selected ones of conductors F1 through F24, in which case only selected ones of the CB flip-flops will be set in those groups of X cells in which the conductor equivalent to conductor 812 in the respective Y cells are energized.

In this manner operations performed in the X cells may be controlled in accordance with data contained in the respective Y cells. As will be described below the operation of the Y cell of FIGS. 8 and 11 is essentially independent of the data contained in the respective group of X cells. However there is one way in the illustrative embodiment of the invention in which the operation of a Y cell may be controlled in accordance with the states of the respective X cells. OR gate 930 on FIG. 9 is provided with 24 inputs. Each one of these inputs is connected to the 1 output of a respective one of the CA flip-flops in the group. Thus conductor 931 is high in potential if at least one of the CA flip-flops in the 24 X cells is in the 1 state. As will be described below the potential of conductor 931 may be used to control the setting of flip-flop $GB_k$ in the 1 state. Flip-flop $GB_k$ serves in a capacity similar to the 24 CB flip-flops in the 24 X cells and flip-flop $GA_k$ serves in a capacity similar to the 24 CA flip-flops. Just as the CB flip-flops may be set in accordance with data contained in the Y cells and the energization of conductor 812, flip-flop $GB_k$ may be set in accordance with the states of the 24 respective CA flip-flops and the energization of conductor 931.

On FIGS. 6–11 enough X cells are shown to understand the interactions between them. Only one Y cell is shown on FIGS. 8 and 11. However it must be understood that the Y cells also form an array and interact in much the same manner as the X cells. If FIGS. 8 and 11 are rotated counterclockwise 90 degrees the Y cell looks like an X cell. The series configuration of Y cells may be visualized by considering other Y cells to both the right and left of the rotated cell of FIGS. 8 and 11. (In the rotated configuration the 24 X cells associated with each Y cell appear as horizontal projections.) The GB flip-flop in each Y cell serves to register a match or mismatch. The GA flip-flop in each Y cell controls the activity condition of the cell. Thus the GB flip-flop of a Y cell is equivalent to the CB flip-flop of an X cell and the GA flip-flop of a Y cell is equivalent to the CA flip-flop of an X cell. In the X cell array a match or mismatch indication represented in a CB flip-flop can control the activity condition in either the same cell or either adjacent cell. The same holds true in the Y cell array. If a GB flip-flop is in the 1 state it is possible to activate the GA flip-flop in the same cell or to activate the GA flip-flop in either adjacent cell.

The read-out circuitry has already been described. Referring again to flip-flop Y30 and the associated read-out circuitry on FIG. 8 it is seen that conductor $O_{30}$ may be made high in potential if flip-flop Y30 is in the 1 state or if flip-flop Y30 in one of the preceding Y cells is in the 1 state. Similarly, conductor $\overline{O}_{30}$ can be energized if one of these flip-flops is in the 0 state. However in order for one of these two conductors to be energized as a result of the state of flip-flop Y30 one of gates 806 and 807 must operate. One input to each of these gates is connected to one of the two outputs of flip-flop Y30. The other input to each gate is connected to conductor 813. This conductor is in turn connected to the 1 output of flip-flop $GA_k$. Thus one of conductors $O_{30}$ and $\overline{O}_{30}$ may be energized in a particular Y cell only if the cell is active. In the entire array of M cells assume that only 50 are active. As long as these cells are active continuous read-out signals are transmitted from the array. If in at least one of the 50 active cells flip-flop Y30 is in the 1 state conductor $O_{30}$ is energized. If in at least one of the 50 one of the 50 active cells flip-flop Y30 is in the 1 state conductor $\overline{O}_{30}$ is energized. Similar remarks apply to the 29 other pairs of output conductors and flip-flops Y1 through Y29 in all of the Y cells. The read-out is continuous and functionally speaking is parallel in nature because any one of the same numbered flip-flops in the active Y cells can control the energization of the respective output conductor. If it is desired to read out the data in a particular Y cell it is necessary to isolate this cell by making this cell the only active one in the array. In this manner the potentials on the 30 pairs of output conductors will be dependent solely on the respective data flip-flops in this cell.

The match and write operations in the Y cells are almost identical to those in the X cells. Cable 803 contains 30 pairs of input conductors Y, $\overline{Y}$. Consider first the match operation. This operation may be best understood by considering a particular flip-flop, for example, Y2. If the bit value represented by Y2 is to be used in the comparison one of conductors $Y_2$ and $\overline{Y}_2$ is energized and thus one of the inputs to one of gates 1123 and 1124 is energized. The other input of each of these gates is connected to the 0 or 1 output of flip-flop Y2. As in X cell one of these gates operates only if there is no match. If the data bit in flip-flop Y2 need not be examined during the comparison neither of conductors $Y_2$ and $\overline{Y}_2$ is energized and neither of gates 1123 and 1124 operates. OR gate 1116 is provided with two inputs for each of the 30 data flip-flops in the Y cell. Conductor 1126 is thus high in potential only if a mismatch is detected. Flip-flop $GB_k$ may be set on either a match or a mismatch. On a mismatch, with conductor 1126 high in potential, one input of gate 1128 is energized. If conductor $G\overline{M}Y$ is energized the gate operates and transmits a pulse through OR gate 1129 to one input of gate 1130. The other input to this gate is connected to the output of OR gate 1131. This gate operates if the Y cell is active, i.e., flip-flop $GA_k$ is in the 1 state, or if conductor DAY is pulsed. When gate 1130 operates a pulse is transmitted through OR gate 1132 to set flip-flop $GB_k$ in the 1 state. The flip-flop may also be set in the 1 state following a successful match. If the applied data matches the data contained in the selected flip-flops in the Y cell conductor 1126 is low in potential and inverter 1133 energizes one input of gate 1134. When conductor GMY is pulsed gate 1134 operates to transmit a pulse through OR gate 1129 to one input of gate 1130. Again, if either flip-flop $GA_k$ is in the 1 state or conductor DAY is pulsed OR gate 1131 energizes the other input of gate 1130. The pulse transmitted through OR gate 1132 sets flip-flop $GB_k$ in the 1 state. The sequence of setting flip-flop $GB_k$ in the 1 state is identical to that for setting one of the CB flip-flops in the 1 state.

To write data into the flip-flops in the Y cells conductor STY is pulsed. This energizes one input of gate 1140. The other input is connected to the output of OR gate 1131. Thus gate 1140 operates when conductor STY is pulsed if either flip-flop $GA_k$ is in the 1 state or if conductor DAY is pulsed together with conductor STY. The write operation may be controlled independent of the activity condition of the cell or may be made dependent upon the activity condition of the cell by not pulsing conductor DAY. When gate 1140 operates conductor 1115 is energized. Consider again flip-flop Y2. With conductor 1115 energized one input of each of gates 1117 and 1118 is high in potential. If data is to be written into flip-flop Y2 one of conductors $Y_2$ and $\overline{Y}_2$ is high in potential and one of gates 1117 and 1118 operates to transmit a pulse through the respective one of OR gates 1107 and 1108 to set flip-flop Y2 in the desired state. The write operation in a Y cell is also identical to the write operation in an X cell. The only difference is that OR gates such as 1107 and 1108 are included in the various signal paths. These OR gates are necessary because the flip-flops in the Y cells may have data written into them in accordance with signals on the respective Y, $\overline{Y}$ conductor pairs, or in accordance with signals on conductor pairs $X_{10}$, $\overline{X}_{10}$.

Flip-flop $GB_k$ may be set in the 1 state as a result of a successful match or mismatch. The flip-flop may be reset directly if conductor RBY is pulsed. Similarly flip-flop $GA_k$ may be reset directly if conductor RAY is pulsed. Gate 1141 is included to provide some control of the Y cell operation in accordance with data contained in the respective group of X cells. It will be recalled that conductor 931 is high in potential if any one of the 24 X cells in group *k* is active. In such a case one input to gate 1141 is energized. If conductor TXY is pulsed gate 1141 operates to transmit a signal through OR gate 1132 to set flip-flop $GB_k$. Thus if it is desired to set the GB flip-flop in any Y cell if at least one of the respective X cells is active it is only necessary to pulse conductor TXY.

If flip-flop $GB_k$ is in the 1 state flip-flop $GA_k$ may be set in the 1 state, i.e., the cell may be made active, if conductor GDY is pulsed. With flip-flop $GB_k$ in the 1 state one input to gate 1142 is energized. When conductor GDY is pulsed the gate operates to transmit a pulse through OR gate 1103 to set flip-flop $GA_k$. It is also possible to activate the adjacent cell on the right if flip-flop $GB_k$ is in the 1 state and conductor GRY is pulsed. It will be noted that conductor $GB_k$ is extended from the 1 output of flip-flop $GB_k$ to the Y cell on the right. In a similar manner the Y cell to the left extends conductor $GB_{k-1}$ to FIGS. 8 and 11. This conductor is high in potential if the adjacent cell on the left has its GB flip-flop in the 1 state. In such a case one input to gate 1102 is energized and when conductor GRY is pulsed the gate operates to transmit a signal through OR gate 1103 to set flip-flop $GA_k$ in the 1 state. It is also possible to activate the adjacent cell on the left if flip-flop $GB_k$ is in the 1 state and conductor GLY is energized. Conductor $GB_k$, connected to the 1 output of flip-flop $GB_k$, is extended to the cell on the left. In a similar manner conductor $GB_{k+1}$ which is connected to the 1 output of flip-flop GB in the adjacent cell on the right is extended to FIG. 11 and is connected to one input of gate 1104. If flip-flop GB in cell $k+1$ is in the 1 state and conductor GLY is pulsed gate 1104 operates to transmit a pulse through OR gate 1103 to set flip-flop $GA_k$ in the 1 state. This propagation of signals between adjacent Y cells is identical to the propagation of signals between adjacent X cells.

Control conductor PRY, output conductor $O_m$ and the P conductor extended between adjacent Y cells are provided in order that a particular propagate command be executed. Very often only one Y cell in the array will be active. The propagate command under consideration is essentially the following: "Activate all cells between and including an already active cell and the first cell to its right that does not match the input pattern, and in this first cell to the right that does not match the input pattern set the GB flip-flop in the 1 state." To execute the command conductor RBY is pulsed to reset all of the GB flip-flops. At this time all of the GB flip-flops are in the 0 state, conductor $O_m$ is de-energized, and the GA flip-flop is in the 1 state in only one cell. A matching pattern is then applied to the Y. $\overline{Y}$ conductor pairs and conductor PRY is energized. Suppose cell *k* is the cell in the array which is active. The 1 output of flip-flop $GA_k$ is energized and with the pulsing of conductor PRY gate 1152 transmits a pulse through OR gate 1151 to the $P_k$ conductor. This conductor is extended to cell $k+1$. If the contents of cell *k* match the input pattern conductor 1126 is low in potential. Gate 1150 and gate 1128 do not operate because one of their inputs is low. Due to the inverting action of inverter 1133 one input to gate 1134 is high. However conductor GMY is not pulsed and gate 1134 does not operate either. Thus flip-flop $GB_k$ is not set. The net result of the operation in the first cell of the string under consideration is that a signal is transmitted to the next stage over the respective P conductor.

Consider now the operation of the second cell. Assume that the cell of FIGS. 8 and 11 is the second cell and that the first cell in the string is cell $k-1$. A positive potential is transmitted on conductor $P_{k-1}$ to one input of gate 1143. If the contents of the second cell, cell *k*, match the input pattern conductor 1126 is low in potential and inverter 1133 causes a high potential to be applied to the second input of gate 1143. This gate operates and sets flip-flop $GA_k$ in the 1 state through OR gate 1103. At the same time that this cell is made active a signal is transmitted through OR gate 1151 to the P conductor extended to the next stage. The GB flip-flop is not set in the 1 state because again none of gates 1150, 1128 and 1134 operates.

This operation continues down the line. As long as the flip-flop content of a cell matches the input pattern it is made active and a signal is transmitted over the respective P conductor to the succeeding stage. The GB flip-flop remains reset in all cells which are made active. This propagation continues until finally a cell is reached in which the cell content does not match the input pattern. In this cell conductor 1126 is high in potential. Consequently the output of inverter 1133 is low in potential, gate 1143 does not operate, and the cell is not activated. However, because conductor 1126 is high in potential one input of gate 1150 is energized. The other input to this gate which is connected to the P conductor from the preceding cell is also high in potential. Thus, gate 1150 operates and transmits a pulse through OR gate 1130 to set flip-flop $GB_k$. Since flip-flop $GA_k$ is not set conductor $P_k$ is not energized and the propagation of signals ceases. The cell at the end of the string is the only one with its GB flip-flop in the 1 state. OR gate 1101 operates and conductor $O_m$ is energized. The energization of this conductor notifies the control that the propagation sequence is over. Until the end cell in the string finally has its GB flip-flop set in the 1 state conductor $O_m$ is low in potential. At the end of the sequence the conductor is energized. The reason for providing conductor $O_m$ is the following. The control may not know at the beginning of the sequence how long a time is required for the string of cells to be activated since the control may not be aware of the data patterns stored in the cells. By providing conductor $O_m$ the control is notified when the propagation has terminated and may proceed to control the execution of other orders. It should be noted that during the propagation conductor PRY does not have to be continuously energized. This conductor is energized initially in order that the GA flip-flop in the first cell in the string operate its gate 1152 to transmit a pulse through gate 1151 to its P conductor. In the succeeding cells however the gates equivalent to gate 1143 operate. Since the output of gate 1143 is an input of OR gate 1151 in the succeeding cells the OR gates operate even in the absence of the energization of conductor PRY. Thus, conductor PRY must be energized only for a brief instant at the beginning of the sequence. From a functional point of view the connection of the output of gate 1143 to one of the inputs of gate 1151 is not required if conductor PRY remains energized throughout the time interval of propagation. Since the operation of gate 1143 controls the setting of flip-flop $GA_k$, and if conductor PRY is energized gate 1152 controls the pulsing of conductor $P_k$ the direct connection from gate 1143 to OR gate 1151 is not required. However, were this connection not included conductor $P_k$ would not be pulsed until after flip-flop $GA_k$ is set. By providing the direct connection from gate 1143 to OR gate 1151 the flip-flop is by-passed and the activation of the string of cells is faster.

It will be recalled that conductor 812 is energized in accordance with data contained in the Y cell, and since conductor 812 is one input to each of the OR gates such as 1001 in the 24 X cells the energization of this conductor controls X cell operations. Cable 803 contains the 30 Y, $\overline{Y}$ conductor pairs. The cable also contains six X, $\overline{X}$ conductor pairs. Conductor pairs $X_{11}$, $\overline{X}_{11}$ through $X_{16}$, $\overline{X}_{16}$ are associated with respective flip-flops Y25 through Y30. Each flip-flop is provided with a pair of gates such as 830 and 831 and the outputs of these gates feed into OR gate 820. The operation of OR gate 820 is similar to the operation of the X and Y cell OR gates involved in the match operations, namely the 24 X cell OR gates such as 1004 and the Y cell OR gate 1116. Conductor 812 is high in potential if the data contained in flip-flops Y25 through Y30 does not match the data signals applied on the six conductor pairs $X_{11}$, $\overline{X}_{11}$ through $X_{16}$, $\overline{X}_{16}$. OR gate 820 is also provided with an additional input, this input being connected to the output of gate 802. One input of gate 802 is conductor 813 which is connected to the 1 output of flip-flop $GA_k$. The other input to gate 802 is control conductor DGY. If when control conductor DGY is pulsed cell *k* is active, gate 802 operates and conductor 812 is high in potential. Even without an applied input pattern on the six input conductor pairs $X_{11}$, $\overline{X}_{11}$ through $X_{16}$, $\overline{X}_{16}$, by pulsing conductor DGY the only OR gates such as 1001 which may operate in the X cells are those contained in groups whose respective Y cells are active. Thus while the X cell control of Y cell operations is relatively simple in that the GB flip-flop in any cell may be set in the 1 state if any one of the 24 associated X cells is active, the Y cell control of the operations in the respective group of X cells is more complex. First, the control is not direct. Even if conductor 812 is energized the effect in the X cells depends upon the particular operation being performed, e.g., whether control conductor GMX or $G\overline{MX}$ is pulsed. Second, conductor 812 may be energized not only if the respective Y cell is active, but in addition in accordance with the matching of the contents of selected ones of flip-flops Y25 through Y30 with applied data signals.

In the illustrative embodiment of the invention each of cells 1 through M is identical to the cell shown in FIGS. 6–11. The only exception is cell 1 in which there is a minor change. It will be noted that the output conductors $O_1$, $\overline{O}_1$ through $O_{30}$, $\overline{O}_{30}$ enter each cell via cable 804. Each output conductor is one input of a respective OR gate such as 805, the other input to the gate being connected to the output of a gate such as 806. The output conductors originate in cell 1 and for this reason in cell 1 the output conductors do not enter the cell. Thus, the 60 OR gates such as 1121, 1122, 805 and 808 may be omitted in cell 1.

In the illustrative embodiment of the invention each group of 24 X cells is identical to that shown on FIGS.

6–11. The only exceptions are groups 1 and M. X cell 24 in group 1 has no cell preceding it. Consequently, there is no need to extend a conductor from the 1 output of flip-flop $CA_{24}$ to the preceding stage. Similarly there is no conductor from cell 1 in the preceding cell which is extended to cell 24 in the first group. Thus if FIGS. 6–11 represent the first group of cells, conductors $CA_{24,\ k}$ and $CA_{1,\ k-1}$ can be omitted in this group. Since conductor $CA_{1,\ k-1}$ is omitted, gate 613 and OR gate 614 can be omitted from the circuit and the output of gate 612 can be connected directly to one input of gate 616. Similarly the CA conductor entering and the CA conductor leaving cell 1 in group M can be omitted since there is no group succeeding group M. In such a case gate 918 and OR gate 917 may be omitted from the circuit and the output of gate 916 may be connected directly to one input of gate 919. Other variations are possible with regard to the first and last X cells in the entire array. For example, it may be desired to provide end-around shifts in the X dimension. In such a case conductor $CA_{1,\ M}$ may be connected to the CA conductor which is connected to gate 613 in cell 24 in the first group, and conductor $CA_{24,\ 1}$ may be connected directly to the CA conductor connected to gate 918 in cell 1 in group M.

Figure 5:
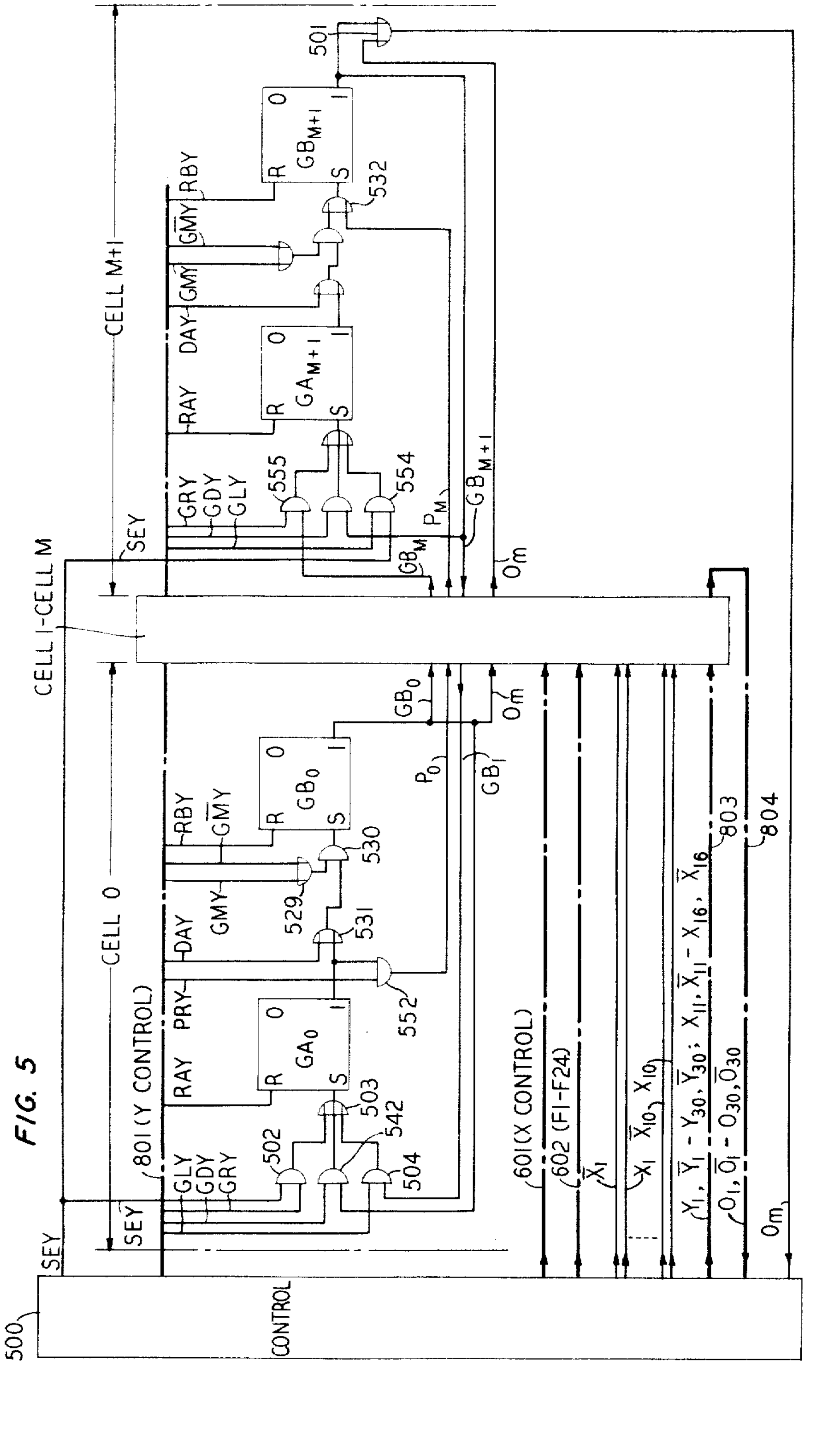
FIG. 5 is a schematic representation of the illustrative embodiment of the invention which further shows the detailed circuitry included in the first and last Y cells of the array.
Figures 6, 12:
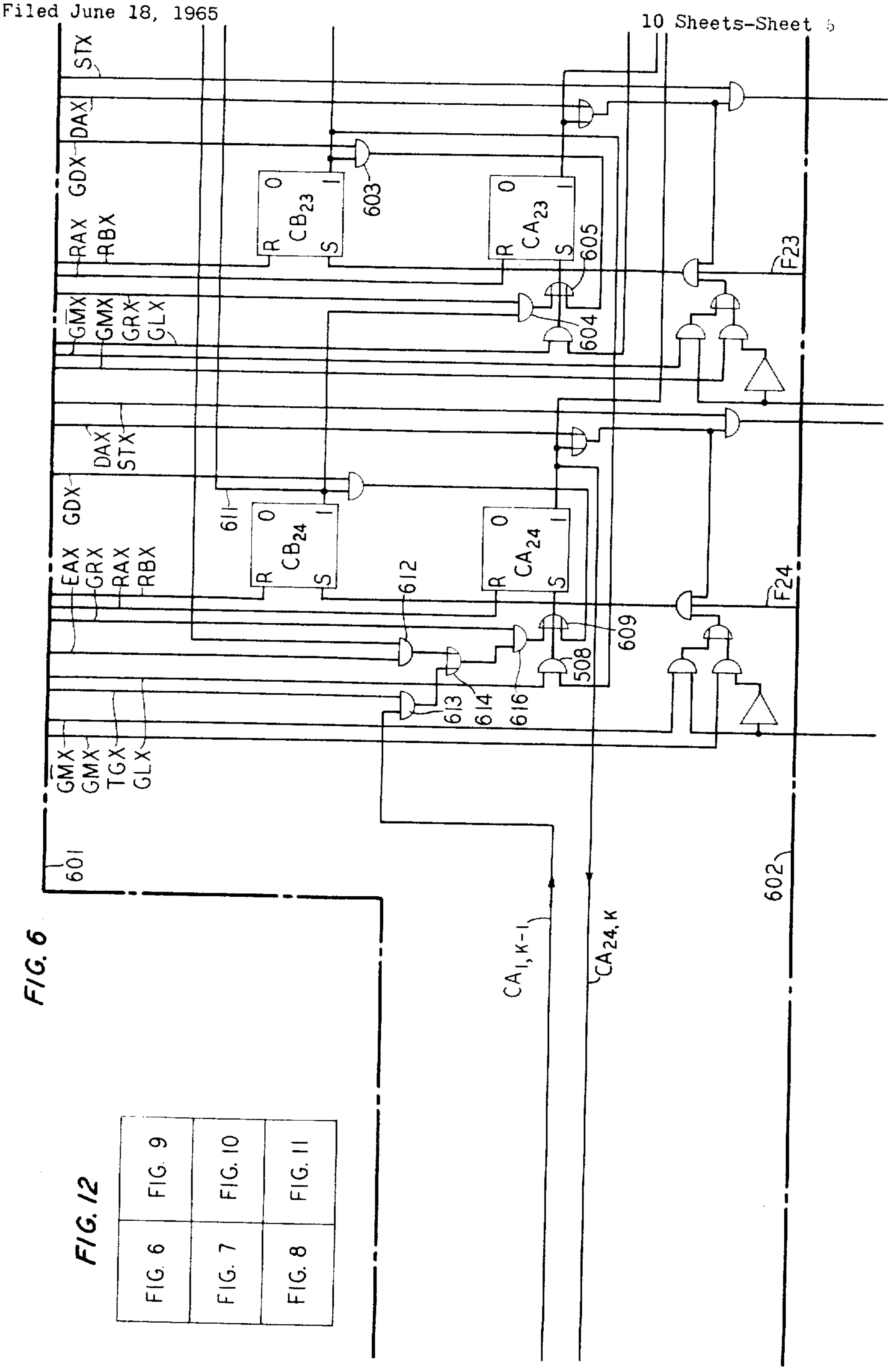
FIGS. 6–11 are a schematic representation of the detailed circuitry included in a typical Y cell and associated X cells.
FIG. 12 shows the arrangement of FIGS. 6–11.
Figure 7:
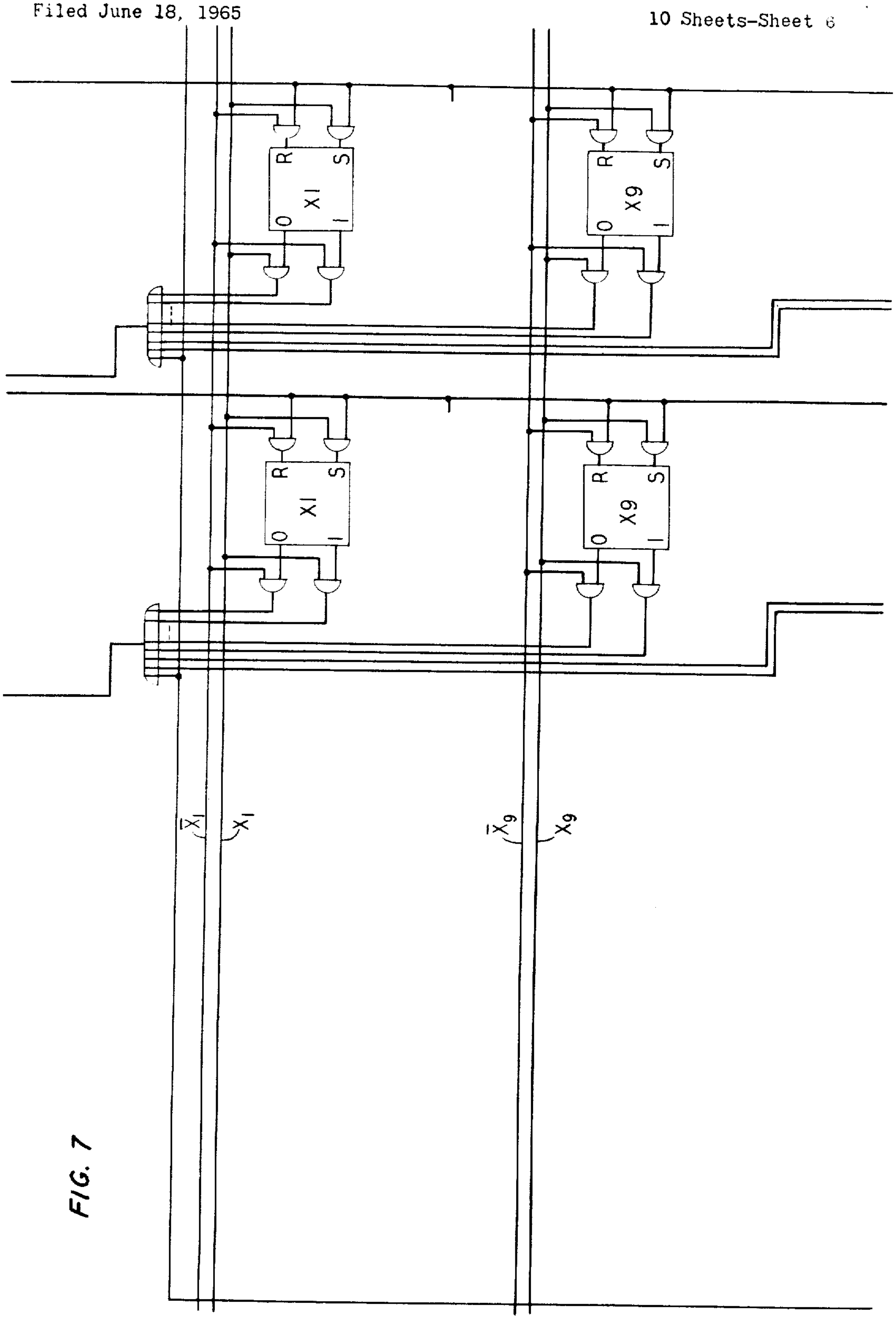

It is to be recalled that each Y cell is individually connected to the two adjacent cells. The same holds true of cells 1 and M. However, since these cells are the first and last in the M-cell array additional circuitry is required for the individual connections to cell 1 and still more circuitry is required for the individual connections to cell M. This circuitry is shown on FIG. 5. To the left of cell 1 is cell O and to the right of cell M is cell M+1. Cell 0 and cell M+1 are not true cells. These cells include only GA and GB flip-flops. They do not include the 30 Y flip-flops to be found in each of the other cells nor do they include 24 X cells. Cells 0 and M+1 are provided in order that cell 1 and cell M be no different from the other cells in the array, i.e., in order that cell 1 receive the usual input signals and that cell M produce the usual output signals. FIG. 5 will also be helpful in understanding the overall organization of the illustrative embodiment of our invention.

Cells 1 through M are shown merely in block diagram form. Cell 0 is to the left of cell 1 and cell M+1 is to the right of cell M. All control functions are determined by control 500. The Y control cable 801 passes through not only cells 1 through M but also through cells 0 and M+1. The same is not true however of the X control cable 601. Since cells 0 and M+1 do not contain X cells cable 601 is provided with connections to only cells 1 through M. Similar remarks apply to cable 602 which which contains conductors F1–F24, and the X signal data inputs $X_1$, $\overline{X}_1$ through $X_{10}$, $\overline{X}_{10}$. Cable 803 contains the 30 conductor pairs $Y_1$, $\overline{Y}_1$ through $Y_{30}$ $\overline{Y}_{30}$, and the six conductor pairs $X_{11}$, $\overline{X}_{11}$ through $X_{16}$, $\overline{X}_{16}$. The former group of conductors control match and write operations in the Y cells and the latter group of conductors control X cell operations in accordance with data contained in flip-flops Y25 through Y30 in the Y cells. Since cells 0 and M+1 do not include flip-flops Y1 through Y30 cable 803 is extended to only cells 1 through M. Similarly cable 804 contains the 30 pairs of conductors $O_1$, $\overline{O}_1$ through $O_{30}$, $\overline{O}_{30}$ on which the output signals are developed. These signals are developed in cells 1 through M (from left to right) and are extended back to control 500. Conductor $O_m$ originates in cell 0 and is one of the inputs to cell 1. The same conductor is an output from cell M and is extended to cell M+1. The output conductor $O_m$ from cell M+1 is extended to control 500. Thus conductor $O_m$ can be energized not only in cells 1 through M but in addition in either of cells 0 or M+1.

It will be noted that while cable 801 contains all of the Y control conductors shown on FIGS. 8 and 11, not all of these conductors are extended to cells 0 and M+1. This is to be expected since fewer operations can be performed in cells 0 and M+1 than in cells 1 through M. Conductor SEY shown on FIG. 5 is also a Y control conductor. However this conductor is extended to only cells 0 and M+1 and for this reason is not included in cable 801 since the signal on this control conductor is not required by cells 1 through M.

Consider first cell 0. This cell is provided with flip-flops $GA_0$ and $GB_0$. The 1 output of flip-flop $GB_0$ is extended to the next cell, cell 1, just as the 1 output of flip-flop $GB_k$ on FIG. 11 is extended to the adjacent cell on the right. The 1 output of flip-flop $GB_0$ is also connected to conductor $O_m$ which is extended to cell 1. It will be noted that on FIG. 11 the 1 output of flip-flop $GB_k$ is connected to an input of OR gate 1101, the output of this OR gate being extended to the next stage and the other input of the OR gate being the $O_m$ conductor from the previous stage. Since the $O_m$ conductor originates in cell 0 there is no need for an OR gate such as 1101.

Flip-flop $GB_0$ can be reset in the ordinary manner with the pulsing of conductor RBY. However the setting of the flip-flop is slightly different from the setting of the GB flip-flop in each of cells 1 through M. The setting pulse for flip-flop $GB_k$ on FIG. 11 is derived from OR gate 1132. This OR gate has three inputs, the outputs of gates 1141, 1150 and 1130. The former two gates are operated in accordance with data in the X cells or the Y cells. Since there is no such data in cell 0 these two gates are not required. The only gate which is required is gate 530 which is equivalent to gate 1130. Since the setting pulse for flip-flop $GB_0$ can be derived from only one gate, gate 530, there is no need for an OR gate equivalent to OR gate 1132. One input to gate 530 is derived from OR gate 531 which is equivalent to OR gate 1131. The two inputs to this OR gate are the DAY conductor and the output of the respective GA flip-flop. The other input to gate 530 is the output of OR gate 529. This OR gate is equivalent to OR gate 1129 on FIG. 11. OR gate 1129 has two inputs. One of gates 1128 and 1134 operates depending on the pulsing of one of conductors GMY and $\overline{GMY}$ and the operation of OR gate 1116. In cell 0 there is no OR gate equivalent to OR gate 1116 and for this reason conductors GMY and $\overline{GMY}$ are connected directly to the two inputs of OR gate 529. The pulsing of either of these conductors energizes one input of gate 530. Flip-flop $GB_0$ is set in the 1 state if at the same time conductor DAY is pulsed or flip-flop $GA_0$ is in the 1 state. Gate 552 is equivalent to gate 1152 on FIG. 11. One input to this gate is the 1 output of the respective GA flip-flop and the other input to the gate is the PRY conductor. The output of gate 552 is connected to conductor $P_0$ which is extended to cell 1. On FIG. 11 OR gate 1151 is provided since signal $P_k$ can be derived from either gate 1152 or gate 1143. Gate 1143 is energized only if a P signal is received from the preceding cell. Since there is no cell before cell 0, FIG. 5 does not include a gate equivalent to gate 1143 and for this reason there is no need for an OR gate equivalent to OR gate 1151. Thus the output of gate 552 is connected directly to conductor $P_0$.

OR gate 503 and gates 502, 504 and 542 are equivalent to the four respective gates on FIG. 11. Gate 504 operates to set flip-flop $GA_0$ if conductor $GB_1$, extended from cell 1 to cell 0, is energized when conductor GLY is pulsed. Gate 542 operates to set flip-flop $GA_0$ if when conductor GDY is pulsed flip-flop $GB_0$ is in the 1 state. Gate 1102 on FIG. 11 operates if a GB signal is received from the preceding cell when conductor GRY is pulsed. There is no cell before cell 0 and for this reason conductor SEY is provided. This conductor is connected to one input of gate 502. If this conductor is pulsed together with conductor GRY gate 502 operates to set flip-flop $GA_0$ in the 1 state. These two conductors may be pulsed together whenever it is desired to activate the leftmost cell in the entire array.

Cell M+1 is very similar to cell 0. Conductor $GB_M$ is extended from cell M to cell M+1 and is one input to gate 555. The other input to this gate is conductor GRY and thus flip-flop $GA_{M+1}$ is set in the same manner as are the other GA flip-flops in cells 1 through M. However there is no GB input from cell M+1 to a succeeding cell since cell M+1 is the rightmost cell in the array. Thus while control conductor GLY is connected to one input of gate 554 there is no second input to this gate from a cell to the right of cell M+1. Conductor SEY is connected to the other input of gate 554. When conductor SEY is pulsed together with conductor GLY, flip-flop $GA_{M+1}$ is set in the 1 state. By pulsing these two conductors simultaneously the rightmost cell in the entire array may be activated. Cell M+1 does require an OR gate equivalent to OR gate 1132 on FIG. 11. Since signal $P_M$ is extended to cell M+1 from cell M and this signal can control the setting of flip-flop $GB_{M+1}$, OR gate 532 is required in cell M+1. However a gate equivalent to gate 1152 or 552 is not required. These gates are used to develop P signals extended to adjacent cells on the right. Since there is no cell to the right of cell M+1 and no P signal need be developed, cell M+1 does not include a gate such as 552 or 1152. Cell M+1 does include an OR gate equivalent to OR gate 1101. While in cell 0 such an OR gate is not required since the $O_m$ chain originates in cell 0, an $O_m$ signal must be transmitted through cell M+1 if it is developed in one of the preceding cells or if flip-flop $GB_{M+1}$ is in the 1 state. For this reason OR gate 501 is provided. The final $O_m$ output conductor is extended from this OR gate to control 500 and as described above when this conductor is energized the control is notified that the required string of cells has been activated and that the signal propagation has terminated.

Figure 2:
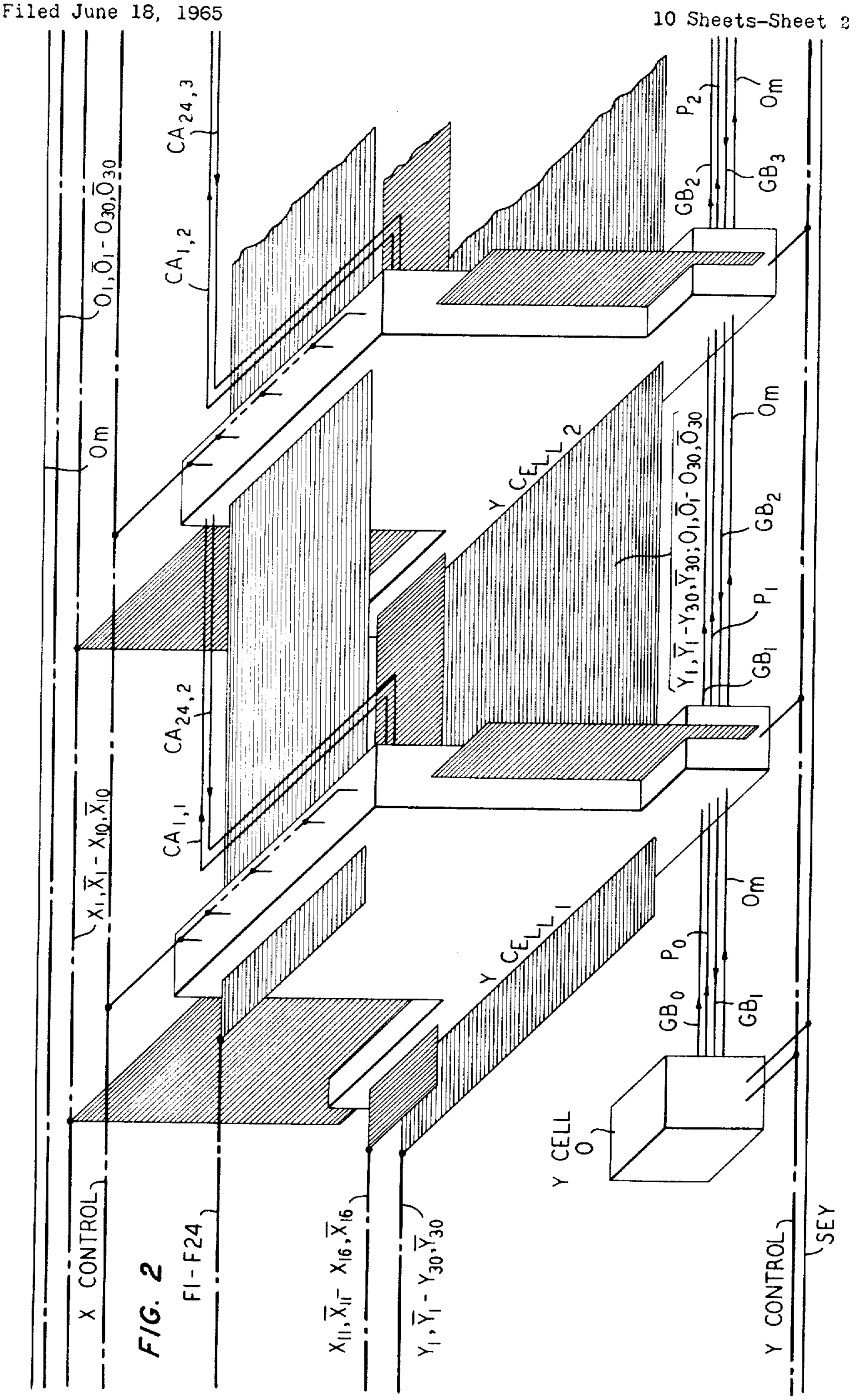
FIGS. 2 and 3 are a symbolic perspective representation of the illustrative embodiment of the invention.
Figures 3, 4:
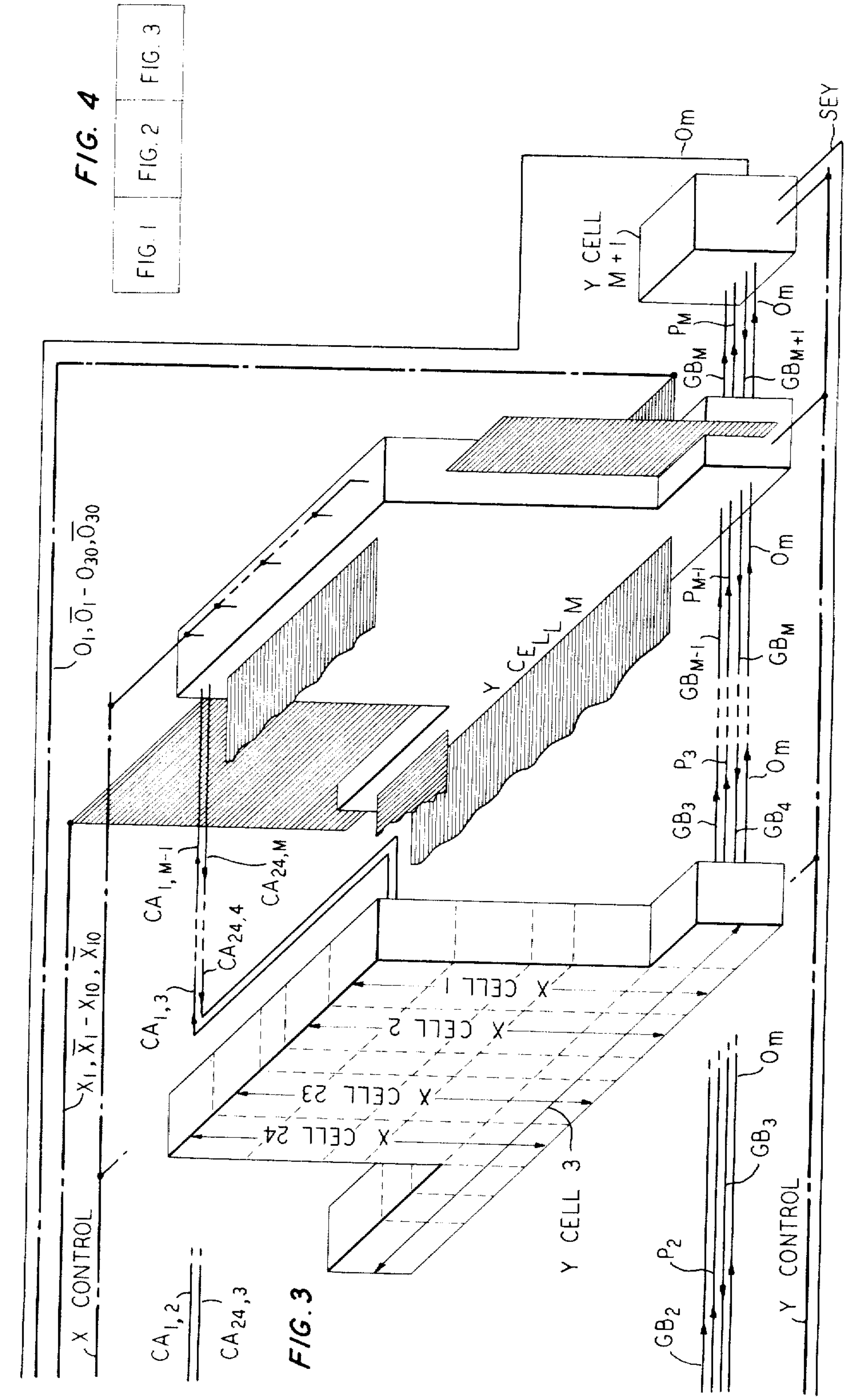
FIG. 4 shows the arrangement of FIGS. 1–3.

FIGS. 2 and 3 are a symbolic perspective representation of the array and further clarify the organization of the illustrative embodiment of the invention. In this drawing, various groups of conductors are shown in planes. Y cells 0, 1, 2, 3, M and M+1 are shown. The connections to cell 3 are omitted in order that the organization of an individual cell be clearly understood. The others of cells 1 through M are similarly organized but for the sake of clarity are shown as integral units.

The various conductors extended to the array from control 500 (FIG. 1) are shown entering the array at the left end of FIG. 2. The X control cable is extended to every group of 24 X cells as shown. The Y control cable is extended to all of the Y cells 0 through M+1. Control conductor SEY is connected only to Y cells 0 and M+1.

The X data input conductors $X_1$, $\overline{X}_1$ through $X_{10}$, $\overline{X}_{10}$ are shown in a series of planes passing through respective groups of 24 X cells. Each of the ten conductor pairs in every plane is connected to 24 respective flip-flops. It will be noted that each plane passes through a Y cell as well as the respective group of 24 X cells since conductors $X_{10}$ and $\overline{X}_{10}$ are extended to flip-flops $Y_1$ through $Y_{30}$ in each Y cell.

Conductors F1 through F24 are shown in a plane intersecting the control portion of the X cells. Each F conductor is connected to the control portion of a different X cell in each group of 24 and for this reason the plane representing the F conductors is in a different dimension than the plane representing the X data inputs.

In FIG. 5 and FIGS. 6–11 the 30 conductor pairs $Y_1$, $\overline{Y}_1$ through $Y_{30}$, $\overline{Y}_{30}$ and the six conductors pairs $X_{11}$, $\overline{X}_{11}$ through $X_{16}$, $\overline{X}_{16}$ are contained in the same cable 803. In FIGS. 2 and 3, however, the respective groups of conductor pairs are shown in different planes in the same dimension, for the purpose of more clearly illustrating their respective functions. The plane containing conductor pairs $X_{11}$, $\overline{X}_{11}$ through $X_{16}$, $\overline{X}_{16}$ intersects each Y cell in only that portion containing flip-flops Y25 and Y30. The plane containing conductor pairs $Y_1$, $\overline{Y}_1$ through $Y_{30}$, $\overline{Y}_{30}$ is shown intersecting the Y cells in that portion of each cell containing flip-flops Y1 through Y30.

The 30 output conductor pairs $O_1$, $\overline{O}_1$ through $O_{30}$, $\overline{O}_{30}$ originate in Y cell 1. These conductors pass through each Y cell in the portion of the cell containing flip-flops Y1 through Y30. For the sake of clarity, the 60 output conductors are shown in the same plane as the 60 Y data input conductors. When the plane enters Y cell 1, it contains only the 60 Y data input conductors. When the plane leaves Y cell 1, it further contains the 60 output conductors. The 120 conductors in the plane enter and leave each of cells 2 through M−1. The 120 conductors also enter Y cell M. When the plane leaves Y cell M, it contains only the 60 output conductors since it is only these 60 conductors which are extended back to control 500.

The two CA conductors between X cell 1 in one group of cells and X cell 24 in the adjacent group of cells to the right are also shown in the drawing. Since these conductors enter and leave the control portions of X cells 24 and 1, they are shown connected to the upper portions of the block units.

The four individual conductors connecting adjacent Y cells are also shown in the drawing. The four individual conductors shown on FIG. 5 connecting cell 0 to cell 1 are shown on FIG. 2. These conductors are connected to the control portion of Y cell 1 as is evident from an inspection of FIG. 2. The other groups of four conductors each are similarly shown connecting the control portions of adjacent Y cells. The connections from cell M to cell M+1 shown in FIG. 3 are the same as those shown in FIG. 5. The only output from cell M+1 is conductor $O_m$. As in FIG. 5, this conductor, together with the 30 output conductor pairs $O_1$, $\overline{O}_1$ through $O_{30}$, $\overline{O}_{30}$ is extended to control 500.

Figure 1:
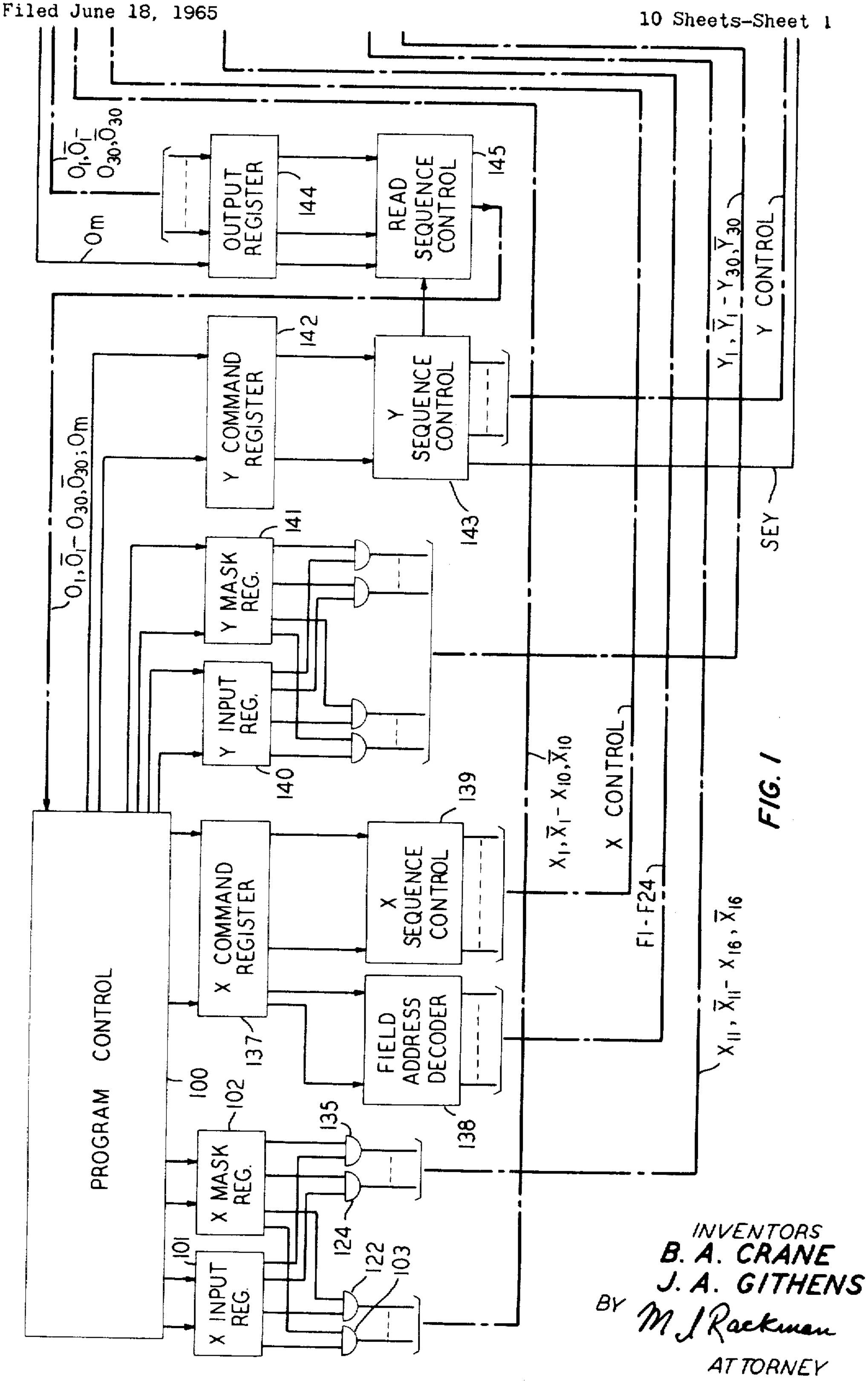
FIG. 1 is a block diagram schematic of an illustrative control circuit which may be used to govern the operation of the illustrative embodiment of the invention.

The two-dimensional array of cells described above, may be used in conjunction with a variety of control circuits. An illustrative control circuit (designated 500 in FIG. 5) is shown in FIG. 1. The outputs from the control circuit match the inputs to the array as seen when FIG. 1 is placed to the left of FIG. 2. The 61 inputs to the control circuit also match the outputs of the array of cells.

The memory array of our invention is governed by a program control 100. The program control operates the various equipments on FIG. 1 in accordance with a prescribed set of instructions and in accordance with the output signals received from the 61 conductors $O_1$, $\overline{O}_1$, through $O_{30}$, $\overline{O}_{30}$ and conductor $O_m$.

The signals on the X data input conductors are derived from two registers 101 and 102. The program control applies ten bit signals to the X input register 101. The signals are converted in the register to ten complementary pairs. Each of 20 outputs of the register is connected to one input of a respective one of the twenty gates 103–122. The program control also applies ten bit signals to X mask register 102. Each of the ten output signals of the register is applied as one of the inputs to each of a pair of the gates 103–122. If a bit in the X mask register is a 0 the two connected gates do not operate and neither conductor in the respective pair of conductors $X_1$, $\overline{X}_1$ through $X_{10}$, $\overline{X}_{10}$ is energized. Thus while the X input register 101 controls the signals applied to the X data input conductors, the ten-bit word stored in the X mask register 102 determines the "don't care" positions.

The X input register 101 also receives an additional six-bit signals from control 100 and includes an additional twelve bit positions which apply signals to respective inputs of gates 124–135. Mask register 102 receives an additional six bit signals from control 100 and includes an additional six bit positions for controlling the application of signals to respective pairs of gates 124–135.

These twelve gates are used to control the signals applied to the twelve conductors $X_{11}$, $\overline{X}_{11}$ through $X_{16}$, $\overline{X}_{16}$.

X command register 137 translates signals received from control 100 and in turn governs the operation of field address decoder 138 and X sequence control 139. The field address decoder determines which of the conductors $F_1$ through $F_{24}$ are to be energized. The X sequence control determines the sequence of the energization of the X control conductors.

The Y data input signals are derived in a manner similar to that of the X data input signals. Program control 100 applies signals to both Y input register 140 and Y mask register 141. The Y input register contains 30 bit positions and the Y mask register contains 30 bit positions. The signals are combined in 60 gates to derive the signals $Y_1$, $\overline{Y}_1$ through $Y_{30}$, $\overline{Y}_{30}$.

Y command register 142 is analogous to X command register 137. The Y command register governs the operation of Y sequence control 143. This unit determines the sequence of the energization of the Y control conductors, that is, conductor SEY and the Y control conductors extended to cells 1 through M.

There are no conductors equivalent to the F conductors in the Y dimension. However there is another type of control required in the Y dimension. The 61 readout signals from the array are derived from the Y cells and these signals must be extended to program control 100 as they are required. The 60 signals $O_1$, $\overline{O}_1$ through $O_{30}$, $\overline{O}_{30}$ are extended to output register 144 together with signal $O_m$. The signals are stored in the output register until Y sequence control 143 determines that they are required by program control 100. At this time Y sequence control 143 operates read sequence control 145 to direct the 61 output signals, or selected ones of them, to program control 100.

The invention has been described with reference to a specific embodiment. It must be understood that this embodiment is only illustrative of the application of the principles of the invention. One aspect of the invention is the control of certain data storage devices independently in different dimensions. These storage devices are flip-flops Y1 through Y24 in each Y cell in the illustrative embodiment. However other arrangements may be devised. For example, another level of flip-flops, e.g., X9 may be written into under the control of Y dimension commands along with flip-flops Y1 through Y24. Another aspect of the invention is the control of X cell operations in accordance with data contained in the respective Y cell and the control of Y cell operations in accordance with the states of the X cells in the respective group. The illustrative embodiment of the invention illustrates just one type of control for each direction. However here too other arrangements may be devised. For example, in some applications it may not be necessary to provide both types of control. If Y cell operations are to be completely independent of the states of the X cells OR gate 930 and conductor 931 may be omitted from the circuitry. Similarly more complex types of control are possible. For example, X cell operations may be controlled not only in accordance with the states of flip-flops Y25 through Y30, but in addtion in accordance with the states of flip-flops Y1 through Y24, and Y cell operations may be controlled not only in accordance with the activity conditions of the X cells in the respective group but in addition in accordance with data contained in the X cell flip-flops. The techniques of our invention are not limited to two-dimensional arrays. They may be applied to three-dimensional and other multi-dimensional configurations. Thus it is to be understood that the embodiment described is only illustrative of the application of the principles of the invention and that various modifications may be made therein and other arrangements may be devised without departing from the spirit and scope of the invention.

What is claimed is:

1. An associative memory comprising a plurality of first memory-logic cells arranged in a series configuration, a plurality of second memory-logic cells arranged in a series configuration, means for coupling groups of said first memory-logic cells to respective ones of said second memory-logic cells, means for applying control signals and data signals to all of said first and second memory-logic cells, means in said first and second memory-logic cells for comparing applied data signals with data stored in said cells, means for registering a match and a mismatch indication in said cells depending on the results of said comparison, means in each of said cells responsive to said control signals and said match-mismatch indicating means for indicating the activity condition of said cell, means for retrieving data stored in said second memory-logic cells, means for controlling logical operations in each of said second memory-logic cells in accordance with applied data and control signals and in accordance with the activity conditions in the respective group of said first memory-logic cells, and means for controlling logical operations in each group of said first memory-logic cells in accordance with applied data and control signals and in accordance with data stored in the respective one of said second memory-logic cells.

2. An associative memory in accordance with claim 1 further including means coupling adjacent ones of said second memory-logic cells for propagating signals between adjacent second cells in accordance with applied signals and in accordance with data stored in said second cells, and means connected to each of said second memory-logic cells for detecting the termination of signal propagation between adjacent ones of said second cells.

3. An associative memory in accordance with claim 1 further including means coupling adjacent ones of said first memory-logic cells for propagating signals between adjacent first cells in accordance with applied signals and in accordance with data stored in said first cells, and means connected to each group of said first memory-logic cells for controlling the propagation of signals from either end cell in the group to the other end cell in the group in accordance with applied signals and in accordance with data stored in said end cells.

4. An assocative memory in accordance with claim 1 further including means in each group of said first memory-logic cells for governing the operations of the respective first cell logical operation controlling means in a selected subgroup of said first cells in accordance with applied data signals.

5. An associative memory in accordance with claim 1 wherein each of said first and second cell logical operation controlling means includes means responsive to a match of data signals applied to the respective cell with selected data stored in the same cell.

6. An associative memory in accordance with claim 5 further including means in each of said first and second memory-logic cells responsive to a predetermined applied control signal for enabling the operation of the respective logical operation controlling means independent of a match of said applied data signals with said selected data stored in the same cell.

7. An associative memory in accordance with claim 1 wherein each of said first and second cell logical operation controlling means includes means responsive to a mismatch of data signals applied to the respective cell with selected data stored in the same cell.

8. An associative memory in accordance with claim 7 further including means in each of said first and second memory-logic cells responsive to a predetermined applied control signal for enabling the operation of the respective logical operation controlling means independent of a mismatch of said applied data signals with said selected data stored in the same cell.

9. An associative memory comprising a plurality of first memory-logic cells arranged in a series configuration, a plurality of second memory-logic cells arranged in a series configuration, means for coupling groups of said first memory-logic cells to respective ones of said second memory-logic cells, means for applying control signals and data signals to all of said first and second memory-logic cells, means for retrieving data stored in said second memory-logic cells, a control circuit and a plurality of flip-flops in each of said memory-logic cells, one of the flip-flops in each of said first memory-logic cells being shared by the respective one of said second memory-logic cells, means responsive to the state of the control circuits in each group of said first memory-logic cells and to applied control signals for controlling logical operations in the respective one of said second memory-logic cells, and means responsive to the state of the control circuit and the states of some of said flip-flops in each of said second memory-logic cells and to applied control signals for controlling logical operations in the respective group of said first memory-logic cells.

10. An associative memory in accordance with claim 9 further including means in each of said first and second memory-logic cells for setting the respective control circuit in a predetermined state in accordance with applied control signals.

11. An associative memory in accordance with claim 10 further including means for setting in a predetermined state the control circuit in either end cell in said series of second memory-logic cells in accordance with applied control signals.

12. An associative memory in accordance with claim 11 further including means in each of said first and second memory-logic cells for selectively storing applied data signals in the respective flip-flops.

13. An associative memory comprising a plurality of first cells, a plurality of second cells, means for applying signals to all of said first and second cells, means for comparing applied signals with data stored in said cells, means in each of said cells and responsive to applied signals and to the result of said comparisons for indicating the activity condition of said cells, means for retrieving data stored in said second cells, means for manipulating data in each of said second cells in accordance with applied signals and in accordance with the activity conditions of a respective group of said first cells, and means for manipulating data in each group of said first cells in accordance with applied signals and in accordance with the data stored in the respective one of said second cells.

14. An associative memory in accordance with claim 13 further including means coupling adjacent ones of said second cells for propagating signals between adjacent second cells in accordance with applied signals and in accordance with the states of said second cells, and means connected to each of said second cells for detecting the termination of signal propagation between adjacent ones of said second cells.

15. An associative memory in accordance with claim 13 further including means coupling adjacent ones of said first cells for propagating signals between adjacent first cells in accordance with applied signals and in accordance with the states of said first cells, and means connected to each group of said first cells for controlling the propagation of signals from either end cell in the group to the other end cell in the group in accordance with applied signals and in accordance with the states of said end cells.

16. An associative memory in accordance with claim 13 further including means in each group of said first cells for governing the manipulation of data in a selected subgroup of said first cells in accordance with applied signals.

17. An associative memory in accordance with claim 13 wherein said data manipulating means in each of said first and second cells operates in accordance with a match of signals applied to the respective cell with selected data stored in the same cell.

18. An associative memory in accordance with claim 17 further including means in each of said first and second cells responsive to a predetermined applied signal for enabling the operation of the respective data manipulating means independent of a match of said applied signals with said selected data stored in the same cell.

19. An associative memory in accordance with claim 13 wherein said data manipulating means in each of said first and second cells operates in accordance with a mismatch of signals applied to the respective cell with selected data stored in the same cell.

20. An associative memory in accordance with claim 19 further including means in each of said first and second cells responsive to a predetermined applied signal for enabling the operation of the respective data manipulating means independent of a mismatch of said applied signals with said selected data stored in the same cell.

21. An associative memory comprising a plurality of first cells, a plurality of second cells, a control circuit and a plurality of bistable data storage devices in each of said cells, one of the bistable storage devices in each of said first cells being shared by a respective one of said second cells, means for applying signals to all of said first and second cells, means for retrieving data stored in said second cells, means for manipulating data in each of said second cells in accordance with applied signals and in accordance with the state of the control circuits of a respective group of said first cells, and means for manipulating data in each group of said first cells in accordance with the state of the control circuit and the states of some of said bistable data storage devices in the respective one of said second cells.

22. An associative memory in accordance with claim 21 further including means in each of said first and second cells for setting the respective control circuits in a predetermined state in accordance with applied signals.

23. An associative memory in accordance with claim 22 further including means for setting in a predetermined state the control circuit in either of two predetermined ones of said second cells in accordance with applied signals.

24. An associative memory in accordance with claim 23 further including means in each of said first and second cells for selectively storing applied signals in the respective bistable data storage devices.

25. An associative memory comprising a plurality of series of data processing cells, each series of cells containing cells of a like configuration, means for applying signals to said cells, means for comparing applied signals with data stored in said cells, means in each of said cells and responsive to applied signals and to the result of said comparison for indicating the activity condition of said cells, means for retrieving data stored in said cells, and means interconnecting said cells for enabling data processing operations to be performed in a cell in accordance with the activity condition of at least one cell in a different series of cells.

26. A data processor comprising a plurality of groups of processing units, each of said groups including a subgroup of processing units and a control processing unit, first communicating means connected between the processing units in each group for enabling data to be processed in the units in each subgroup in accordance with the operation of the respective control unit and for enabling data to be processed in the control unit in accordance with the operations of the units in the respective subgroup, and second communicating means connected between adjacent groups of said processing units for enabling data to be processed in the units of each of said groups in accordance with the operations of the units in others of said groups.

27. A data processor in accordance with claim 26 further including means for transferring data between the units in each subgroup and the respective control unit, and wherein said first communicating means includes means for governing data processing operations in the units in each subgroup in accordance with data contained in the respective control unit, and means for governing data processing operations in each control unit in accordance with data contained in the units in the respective subgroup.

References Cited

UNITED STATES PATENTS

| | | | |
|---|---|---|---|
| 3,106,698 | 10/1963 | Unger | 340—172.5 |
| 3,141,964 | 7/1964 | Fleisher et al. | 235—175 |
| 3,185,965 | 5/1965 | Lee | 340—172.5 |
| 3,284,779 | 11/1966 | Lee et al. | 340—172.5 |
| 3,287,702 | 11/1966 | Borck et al. | 340—172.5 |
| 3,287,703 | 11/1966 | Slotnick | 340—172.5 |
| 3,320,594 | 5/1967 | Davies | 340—172.5 |

ROBERT C. BAILEY, *Primary Examiner.*

PAUL J. HENON, *Examiner.*

J. P. VANDENBURG, *Assistant Examiner.*